(12) United States Patent
Uchiyama

(10) Patent No.: US 10,788,938 B2
(45) Date of Patent: Sep. 29, 2020

(54) LIGHT DISTRIBUTION CONTROLLABLE TOUCH PANEL DEVICE

(71) Applicant: Tianma Japan, Ltd., Kanagawa (JP)

(72) Inventor: Yuichi Uchiyama, Kanagawa (JP)

(73) Assignee: TIANMA JAPAN, LTD., Kanagawa (JP)

( * ) Notice: Subject to any disclaimer, the term of this patent is extended or adjusted under 35 U.S.C. 154(b) by 0 days.

(21) Appl. No.: 16/191,533

(22) Filed: Nov. 15, 2018

(65) Prior Publication Data
US 2019/0146604 A1    May 16, 2019

(30) Foreign Application Priority Data

Nov. 16, 2017 (JP) ................................. 2017-221165

(51) Int. Cl.
| | |
|---|---|
| *G06F 3/042* | (2006.01) |
| *G06F 3/044* | (2006.01) |
| *G06F 3/041* | (2006.01) |
| *G06F 21/84* | (2013.01) |

(52) U.S. Cl.
CPC .............. *G06F 3/042* (2013.01); *G06F 3/044* (2013.01); *G06F 3/0418* (2013.01); *G06F 3/0443* (2019.05); *G06F 3/04166* (2019.05); *G06F 21/84* (2013.01); *G06F 3/0412* (2013.01)

(58) Field of Classification Search
CPC ...... G06F 3/042; G06F 21/84; G06F 3/04166; G06F 3/0418; G06F 3/0443; G06F 3/044; G06F 3/0412
See application file for complete search history.

(56) References Cited

U.S. PATENT DOCUMENTS

| | | | |
|---|---|---|---|
| 2008/0055221 A1 | 3/2008 | Yabuta et al. | |
| 2012/0044190 A1* | 2/2012 | Yilmaz | G06F 3/0412 345/174 |
| 2012/0062503 A1* | 3/2012 | Zhuang | G06F 3/0412 345/174 |
| 2012/0146943 A1* | 6/2012 | Fairley | G02F 1/167 345/174 |
| 2016/0188050 A1 | 6/2016 | Uchiyama | |
| 2017/0344187 A1* | 11/2017 | Ko | G06F 3/0418 |
| 2019/0102007 A1* | 4/2019 | Ito | G02F 1/167 |

FOREIGN PATENT DOCUMENTS

| | | |
|---|---|---|
| JP | 2016-126362 | 7/2016 |
| WO | WO 2006/030745 | 3/2006 |

* cited by examiner

*Primary Examiner* — Temesghen Ghebretinsae
*Assistant Examiner* — Ivelisse Martinez Quiles
(74) *Attorney, Agent, or Firm* — Young & Thompson

(57) ABSTRACT

A driver of a light distribution controllable touch panel device: provides one or more first upper electrode sets with driving potentials for detecting a touch point and measures potentials of one or more second upper electrode sets; or provides the one or more second upper electrode sets with driving potentials for detecting a touch point and measures potentials of the one or more first upper electrode sets; and provides a plurality of lower electrodes with driving potentials according to the driving potentials to control colored electrophoretic particles in a plurality of electrophoretic elements to be in a dispersed state or a collected state.

12 Claims, 14 Drawing Sheets

LIGHT DISTRIBUTION CONTROLLABLE TOUCH PANEL DEVICE

CROSS-REFERENCE TO RELATED APPLICATION

This Non-provisional application claims priority under 35 U.S.C. § 119(a) on Patent Application No. 2017-221165 filed in Japan on Nov. 16, 2017, the entire contents of which is hereby incorporated by reference.

BACKGROUND

The present disclosure relates to a light distribution controllable touch panel device.

In recent years, touch panels have been widely known as user-friendly user interface with the prevalence of smartphones and tablet terminals. Touch panels are mounted on the display modules of various electronic devices. Meanwhile, in order to prevent the image displayed on a smartphone, an ATM, or an in-flight entertainment screen from being viewed from people other than the user, viewing angle control devices are used (refer to WO 2006/030745 A and JP 2016-126362 A).

When a touch panel and a viewing angle control device are individually mounted on a display panel, the thicknesses of the individual devices increase the total thickness of the display device. In the configuration where the viewing angle control device is provided between the touch panel and the display panel, the touch panel is fairly distant from the display panel, which impairs the operability of the touch panel. Furthermore, the display device has more interface with an air layer, so that the surface reflection of the external light impairs the visibility.

SUMMARY

An aspect of present disclosure of a light distribution controllable touch panel device comprising: a plurality of upper electrodes; a plurality of lower electrodes; a plurality of electrophoretic elements sandwiched by the plurality of upper electrodes and the plurality of lower electrodes, each electrophoretic element including colored electrophoretic particles and dispersion medium; and a driver, wherein the plurality of upper electrodes include one or more first upper electrode sets and one or more second upper electrode sets, each of the first upper electrode set and the second upper electrode set including one upper electrode or a plurality of upper electrodes connected by a conductor, wherein the one or more first upper electrode sets and the one or more second upper electrode sets are disposed alternately, and wherein the driver is configured to: provide the one or more first upper electrode sets with driving potentials for detecting a touch point and measure potentials of the one or more second upper electrode sets or provide the one or more second upper electrode sets with driving potentials for detecting a touch point and measure potentials of the one or more first upper electrode sets; and provide the plurality of lower electrodes with driving potentials according to the driving potentials given to the plurality of upper electrodes to control the colored electrophoretic particles in the plurality of electrophoretic elements to be in a dispersed state or a collected state.

It is to be understood that both the foregoing general description and the following detailed description are exemplary and explanatory and are not restrictive of this disclosure.

BRIEF DESCRIPTION OF THE DRAWINGS

The present disclosure can be appreciated by the description which follows in conjunction with the following figures, wherein.

EMBODIMENTS

Figure 1:
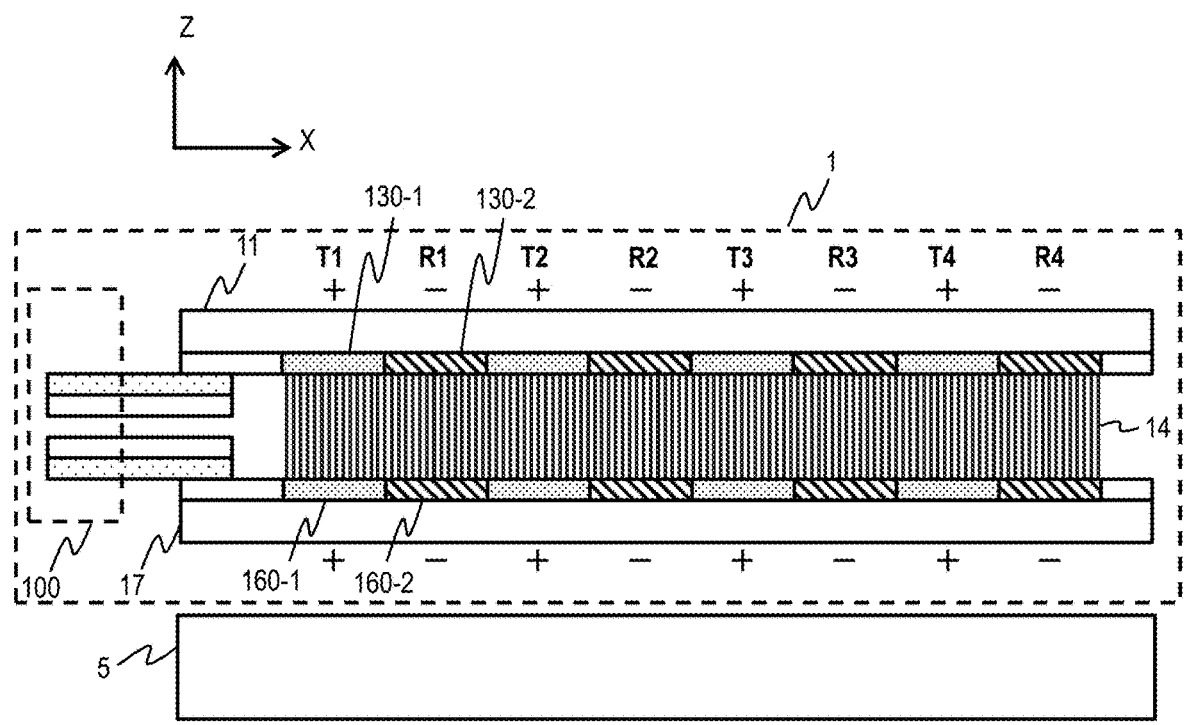
FIG. 1 is a cross-sectional diagram schematically illustrating a configuration example of a display device when a touch panel is in a narrow viewing field state according to Embodiment 1.

Hereinafter, embodiments of this invention will be described with reference to the accompanying drawings. The embodiments are merely examples to implement this invention and are not to limit the technical scope of this invention. Elements common to the drawings are denoted by the same reference signs. The drawings may exaggerate the sizes and the shapes of the elements for clarity of explanation. The ordinal numbers such as "first" and "second" in the description, claims, and drawings are assigned to clarify the relation among the elements and to prevent confusion among the elements. Accordingly, these ordinal numbers are not to numerically limit the elements.

The touch panel having a light distribution control function to be disclosed in the following (hereinafter, the touch panel having this function is simply referred to as touch panel) includes a transparent upper substrate, a transparent lower substrate, and electrophoretic elements arrayed between upper electrodes and lower electrodes. Each electrophoretic element includes colored electrophoretic particles in a dispersion medium. The touch panel has a narrow viewing angle mode and a wide viewing angle mode. The colored electrophoretic particles are dispersed in the narrow viewing angle mode and collected in the wide viewing angle mode.

On the underface of the upper substrate, upper electrodes for detecting a touch point are arrayed. The electrophoretic elements are sandwiched between the upper electrodes and the lower electrodes provided on the top face of the lower substrate. One or more upper electrodes are connected by a conductor into an upper electrode set and a plurality of upper electrode sets are provided.

A driver performs first or second processing. In the first processing, the driver provides driving potentials for detecting a touch point to one or more first upper electrode sets and measures the potentials of one or more second upper electrode sets. In the second processing, the driver provides driving potentials for detecting a touch point to one or more second upper electrode sets and measures the potentials of one or more first upper electrode sets, and further provides driving potentials to a plurality of lower electrodes with reference to the driving potentials for the second upper electrode sets. Through this first or second processing, the driver detects a touch point and further, maintains the state of the colored electrophoretic particles in the selected viewing angle mode.

The upper electrodes are provided with signals (potentials) for detecting a touch point. As described above, the upper electrodes also function as upper electrodes for controlling the light distribution. Accordingly, the lower electrodes need to be provided with potentials for appropriately controlling the electrophoretic elements with reference to the potentials of the upper electrode sets. The configuration such that the upper electrodes additionally work as electrodes for controlling the light distribution enables the touch panel to be thinner and further, achieves high visibility of the displayed image and high operability of the touch panel.

To use the upper electrodes as electrodes for controlling the light distribution, the touch panel in this disclosure employs projected capacitive sensing. The projected capacitive touch panel detects a contact point of a pointer by detecting a change in capacitance occurring between an electrode and the pointer.

Schemes for capacitive sensing in a projected capacitive touch panel includes a self-capacitance sensing scheme and a mutual capacitance sensing scheme. A self-capacitance sensing type of touch panel has a plurality of X electrodes and a plurality of Y electrodes. The X electrodes and the Y electrodes are disposed in a matrix with an insulator interposed therebetween.

Self-capacitance sensing drives the X electrodes and the Y electrodes independently to detect a change in capacitance in each electrode. When a pointer approaches an electrode, the capacitance of the corresponding electrode increases.

Self-capacitance sensing detects an X electrode and a Y electrode where the capacitance has increased to detect the position of the pointer.

A mutual capacitance sensing type of touch panel has transmitter electrodes (for example, X electrodes) as driver electrodes and receiver electrodes (for example, Y electrodes) as sensor electrodes. In general, the driver electrodes and the sensor electrodes are disposed in a matrix with an insulator interposed therebetween. A capacitor (intersection capacitor) is configured at each intersection of a driver electrode and a sensor electrode. When a pointer approaches an intersection capacitor, a part of the electric field at the intersection moves toward the pointer and the capacitance at the intersection decreases. Mutual capacitance sensing detects at which intersection and how big the change in mutual capacitance occurs to detect the position of the pointer. The measurement may directly measure the change in mutual capacitance or measure the change in potential (electric field) detected at a receiver electrode that is caused by the mutual capacitance drawing the electric charge of the receiver electrode.

In the example described hereinafter, the touch panel 1 detects a touch by mutual-capacitance sensing. However, the touch panel 1 may be switchable between mutual-capacitance sensing mode and self-capacitance sensing mode. This description explains an example where strip-like driving electrodes and sensing electrodes are disposed in parallel.

Embodiment 1

[Configuration]

Figure 2:
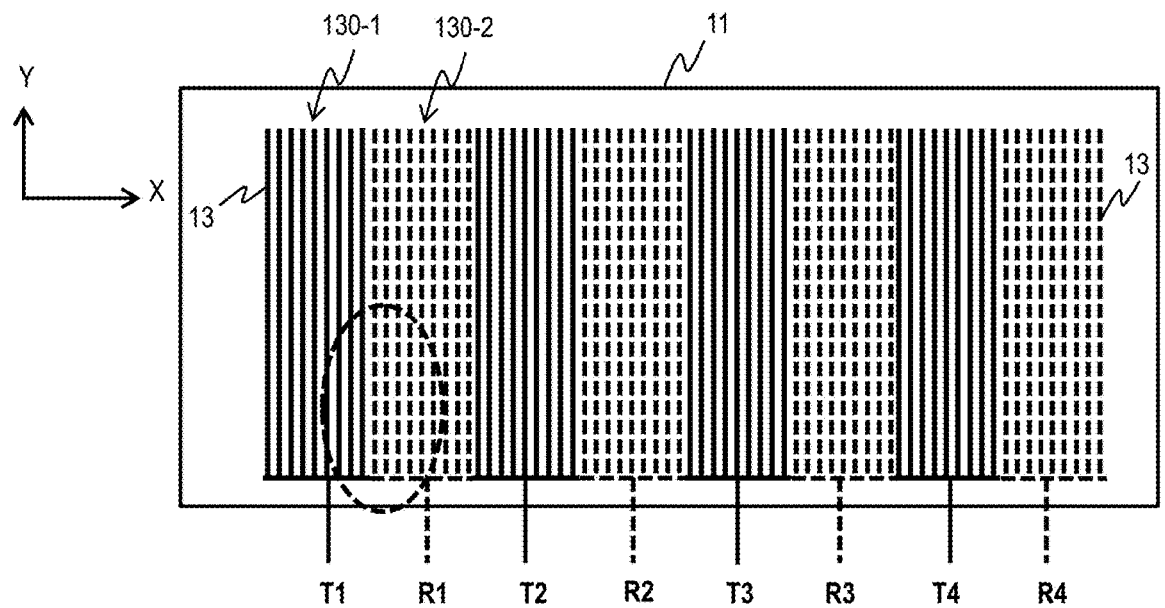
FIG. 2 is a plan diagram schematically illustrating a configuration example of an upper substrate of the touch panel in the narrow viewing field state according to Embodiment 1.
Figure 3:
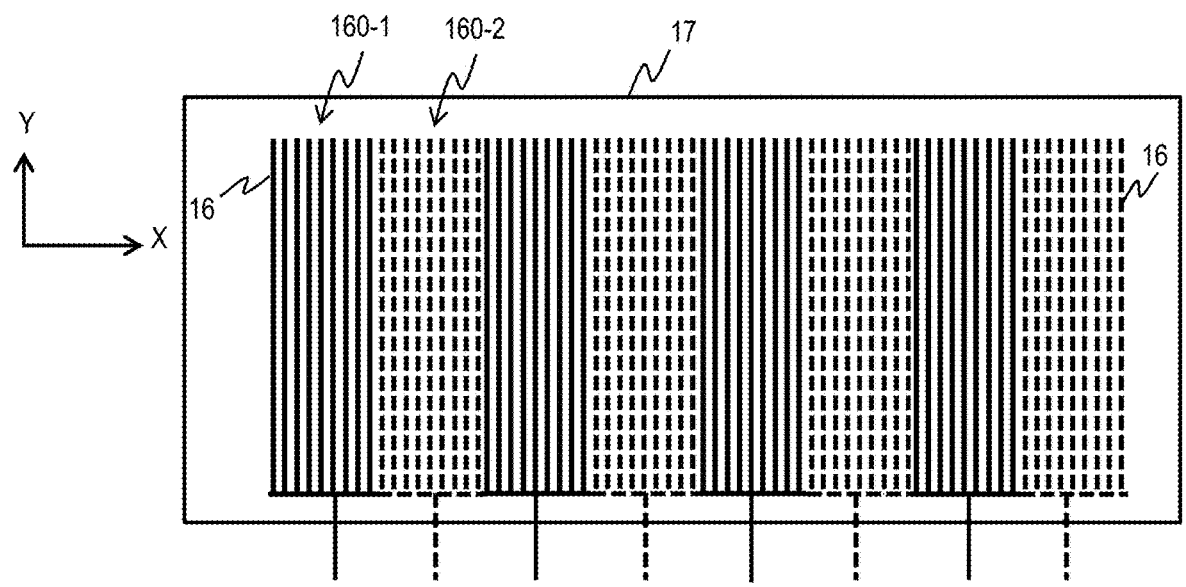
FIG. 3 is a plan diagram schematically illustrating a configuration example of a lower substrate of the touch panel according to Embodiment 1.
Figure 4:
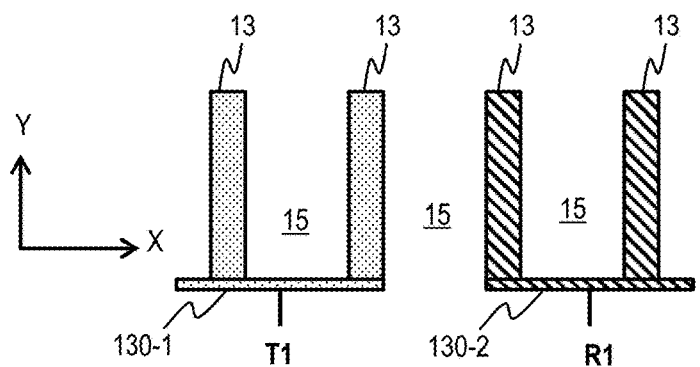
FIG. 4 is an enlarged diagram schematically illustrating an oval region surrounded by a dashed line in FIG. 2 according to Embodiment 1.

FIG. 1 is a cross-sectional diagram schematically illustrating a configuration example of a display device when the touch panel is in a narrow viewing field state. FIG. 2 is a plan diagram schematically illustrating a configuration example of the upper substrate of the touch panel in the narrow viewing field state. FIG. 3 is a plan diagram schematically illustrating a configuration example of the lower substrate of the touch panel. FIG. 4 is an enlarged diagram schematically illustrating the oval region surrounded by a dashed line in FIG. 2.

The display device in the example of FIG. 1 includes a display panel 5 and a touch panel 1 provided in front of the display panel 5. The display panel 5 can be of any type, such as a liquid crystal display panel or an organic light-emitting diode (OLED) display panel.

In this disclosure, the side of the user who sees the image on the display panel 5, or the side to which the light of the image travels is referred to as front side or upper side of the display device and the opposite side is referred to as back side or lower side of the display device. The direction perpendicular to the principal plane of the display panel 5 or the touch panel 1 is referred to as Z-axis direction, the two directions perpendicular to each other within the principal plane are referred to as X-axis direction (second direction) and Y-axis direction (first direction). The Z-axis direction corresponds to the stacking direction of the display panel 5 and the touch panel 1.

The touch panel 1 has a function of a touch panel and further, a function to control the range of outgoing direction of the light transmitted through the touch panel 1 out of the light emitted from the display panel 5. The touch panel 1 is switchable between a wide viewing field state and a narrow viewing field state to transmit the image on the display panel 5. The state (mode) in which the range of outgoing direction of the light from the touch panel 1 is wider is referred to as wide viewing field state (wide viewing angle mode) and the state (mode) in which the range of outgoing direction of the light from the touch panel 1 is narrower is referred to as narrow viewing field state (narrow viewing angle mode). The touch panel 1 in the example of FIG. 1 is in the narrow viewing field state.

The touch panel 1 changes the state of the colored electrophoretic particles (colored charged particles) to change the range of outgoing direction of the light transmitted through light transmissive regions 15 and dispersion medium.

The touch panel 1 is bonded with the front face (top face) of the display panel 5 by a bonding layer. The bonding layer between the touch panel 1 and the display panel 5 can be omitted.

The touch panel 1 includes a driver 100, an upper substrate 11, and a lower substrate 17. The driver 100 controls driving of the touch panel 1. The details of the driver 100 will be described later. The driver 100 is omitted in the drawings except for FIG. 1.

The underface of the lower substrate 17 is opposed to the display panel 5; the top face of the lower substrate 17 is opposed to the underface of the upper substrate 11. The upper substrate 11 and the lower substrate 17 are transparent and are made of glass, polyethylene terephthalate (PET), poly carbonate (PC), or polyethylene naphthalate (PEN), for example. The upper substrate 11 and the lower substrate 17 are inflexible or flexible insulators.

The touch panel 1 further includes a plurality of upper electrode sets 130-1 and a plurality of upper electrode sets 130-2 disposed alternately, and a plurality of lower electrode sets 160-1 and a plurality of lower electrode sets 160-2 disposed alternately. Hereinafter, when the upper electrode sets 130-1 and the upper electrode sets 130-2 do not need to be distinguished from each other, they are simply referred to as upper electrode sets 130. In similar, when the lower electrode sets 160-1 and the lower electrode sets 160-2 do not need to be distinguished from each other, they are simply referred to as lower electrode sets 160.

Each upper electrode set 130 is composed of a plurality of (for example 2 to 500 and in this embodiment, 200) upper electrodes 13. Each lower electrode set 160 is composed of a plurality of (for example, 2 to 500 and in this embodiment, 200) lower electrodes 16. The upper electrodes 13 and the lower electrodes 16 can be transparent electrodes made of indium tin oxide (ITO), ZnO, or IGZO, for example. The lower electrodes 16 can be metal electrodes (specifically, made of aluminum or copper, for example).

The lower electrode sets 160 are provided on the top face of the lower substrate 17. The lower electrode sets 160 are disposed to be distant from one another in the X-axis direction on the lower substrate 17. Each lower electrode set 160 is composed of a plurality of lower electrodes 16 disposed to extend in the Y-axis direction and be distant from one another in the X-axis direction and bundled together (or connected by a conductor) on the lower substrate 17. The gaps between lower electrodes 16 are filled with an insulating material. Each lower electrode 16 can be a strip-like conductor.

The upper electrode sets 130 are provided on the underface of the upper substrate 11. The upper electrode sets 130 are disposed to be distant from one another in the X-axis direction on the upper substrate 11. Each upper electrode set 130 is composed of a plurality of upper electrodes 13 disposed to extend in the Y-axis direction and be distant from one another in the X-axis direction and bundled together on the upper substrate 11. The gaps between upper electrodes 13 are filled with an insulating material. Each upper electrode 13 can be a strip-like conductor.

Each upper electrode set 130 is opposed to a lower electrode set 160. Each upper electrode set 130-1 is opposed to a lower electrode set 160-1 and each upper electrode set 130-2 is opposed to a lower electrode set 160-2. Each of the upper electrodes 13 included in an upper electrode set 130 is opposed a lower electrode 16 included in the lower electrode set 160 opposed to the upper electrode set 130.

As will be described later, the upper electrodes 13 function as upper electrodes to be provided with potentials for controlling the light distribution. In an example, each upper electrode 13 is opposed to a lower electrode 16 associated therewith in one-to-one correspondence. In an example, each upper electrode 13 has the same shape as the lower electrode 16 opposed thereto.

The touch panel 1 includes a light distribution control layer between the upper substrate 11 and the lower substrate 17. The light distribution control layer includes a plurality of electrophoretic elements 14 and a plurality of light transmissive regions 15. The electrophoretic elements 14 and the light transmissive regions 15 are disposed to extend in the Y-axis direction and to be alternated in the X-axis direction.

In the X-Y plane, the plurality of electrophoretic elements 14 have a stripe pattern in which the electrophoretic elements 14 are disposed to extend in the Y-axis direction and be distant from one another in the X-axis direction. In similar, the plurality of light transmissive regions 15 have a stripe pattern in which the light transmissive regions 15 are disposed to extend in the Y-axis direction and be distant from one another in the X-axis direction.

The appropriate height of a light transmissive region 15 can be 3 to 300 μm and in this embodiment, 60 μm. The appropriate width of a light transmissive region 15 (or the distance between upper electrodes 13 and the distance between lower electrodes 16) can be 1 to 150 μm and in this embodiment, 20 μm. The appropriate height of an electrophoretic element 14 can be 3 to 300 μm and in this embodiment, 60 μm, which is the same as the height of a light transmissive region 15. The appropriate width of an electrophoretic element 14 can be 0.25 to 40 μm and in this embodiment, 5 μm.

The appropriate width of an upper electrode 13 can be 0.25 to 40 μm and in this embodiment, 5 μm, which is the same as the width of an electrophoretic element 14. Accordingly, the width of an upper electrode set 130 in this embodiment is 5 mm. The appropriate width of a lower electrode 16 can also be 0.25 to 40 μm and in this embodiment, 5 μm, which is the same as the width of an electrophoretic element 14. Accordingly, the width of a lower electrode set 160 in this embodiment is 5 mm.

Each electrophoretic element 14 includes electrophoretic particles and dispersion medium (electrophoretic element material) contained in a space formed between light transmissive regions 15. The electrophoretic particles are colored, for example, in black. The dispersion medium is made of a transparent colorless resin, for example.

Each electrophoretic element 14 is sandwiched by one upper electrode 13 extending in the Y-axis direction and one lower electrode 16 extending in the Y-axis direction. In the example of FIG. 1, the upper electrode 13 extending in the Y-axis direction and the lower electrode 16 extending in the Y-axis direction are in contact with the electrophoretic element material including the electrophoretic particles and the dispersion medium. Between either one or both of the upper electrode 13 extending in the Y-axis direction and the lower electrode 16 extending in the Y-axis direction and the electrophoretic element material, an insulating layer may be provided. The insulating layer can be made of silicon oxide or silicon nitride. Each electrophoretic element 14 may further be sandwiched by another upper electrode 13 extending in the Y-axis direction and another lower electrode 16 extending in the Y-axis direction.

In an example, one electrophoretic element 14 is sandwiched by one upper electrode 13 and one lower electrode 16. That is to say, each upper electrode 13 is opposed to one electrophoretic element 14 in the Z-axis direction. In similar, each lower electrode 16 is opposed to one electrophoretic element 14 in the Z-axis direction.

As alternative examples, the electrophoretic elements 14 may be sandwiched by different pairs of upper electrodes 13 and lower electrodes 16. A plurality of electrophoretic elements 14 may be sandwiched by one upper electrode 13 and a plurality of lower electrodes 16. The plurality of electrophoretic elements 14 may be sandwiched by a plurality of upper electrodes 13 and one lower electrode 16.

In a narrow viewing field state, the electrophoretic particles in each electrophoretic element 14 are dispersed in the dispersion medium. The dispersed electrophoretic particles block the light from the display panel 5 by absorbing the light. As a result, only the light within a narrow outgoing angle in the X-axis direction passes through the touch panel 1.

To perform the touch panel function, the upper electrode sets 130 on the upper substrate 11 are provided with specific signals so that upper electrode sets 130 having high potentials and upper electrode sets 130 having low potentials are disposed alternately. In a narrow viewing field state, each upper electrode set 130-1 (one of the transmitter electrodes T1 to T4 in FIG. 1) is controlled to have a high potential and functions as one transmitter electrode in the touch panel. Each upper electrode set 130-2 (one of the receiver electrodes R1 to R4 in FIG. 1) is controlled to have a low potential and functions as one receiver electrode in the touch panel.

In the narrow viewing field state, an upper electrode 13 and a lower electrode 16 sandwiching the same electrophoretic element 14 are maintained at the same potential. In other words, the upper electrode set 130 and the lower electrode set 160 opposed to each other are maintained at the same potential. As a result, the electrophoretic particles in the dispersion medium are maintained in a dispersed state. The details of the potential control for the upper electrodes 13 and the lower electrodes 16 will be described later. In FIGS. 2 and 3, and in FIGS. 6 and 19 to be described later, the electrodes controlled to have relatively high potentials are indicated by solid lines and the electrodes controlled to have relatively low potentials are indicated by dashed lines.

Figure 5:
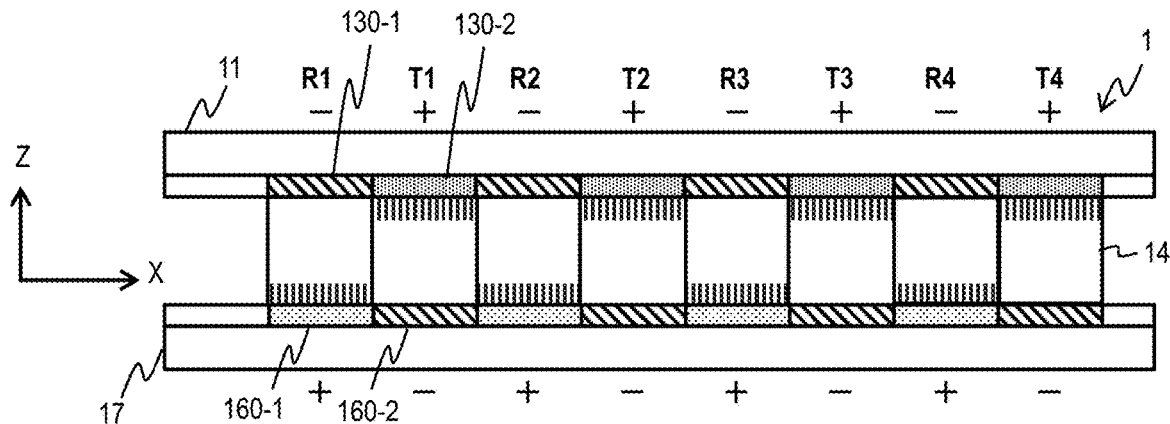
FIG. 5 is a cross-sectional diagram illustrating a schematic configuration example of the touch panel in a wide viewing field state according to Embodiment 1.
Figure 6:
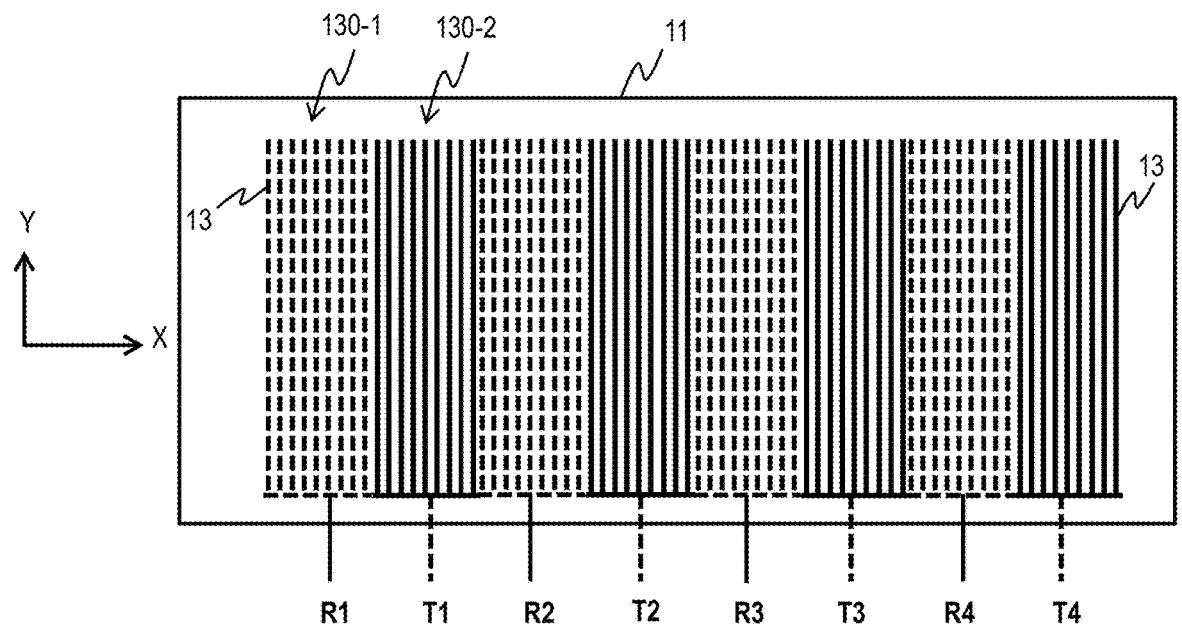
FIG. 6 is a plan diagram schematically illustrating a configuration example of the upper substrate of the touch panel in the wide viewing field state according to Embodiment 1.

FIG. 5 is a cross-sectional diagram illustrating a schematic configuration example of the touch panel 1 in a wide viewing field state. FIG. 6 is a plan diagram schematically illustrating a configuration example of the upper substrate 11 of the touch panel 1 in the wide viewing field state. The wide viewing field state is achieved by collecting the electrophoretic particles to the proximity of either one of the electrodes sandwiching the electrophoretic element 14. The most part of the electrophoretic element 14 becomes composed of only the transparent dispersion medium to make the electrophoretic element 14 transmissive. As a result, the light within a wide outgoing angle in the X-axis direction passes through the touch panel 1.

Controlling the upper electrode sets 130-1 to have a low potential and controlling the upper electrode sets 130-2 to have a high potential (in other words, interchanging the relative potentials in the narrow viewing field state between the upper electrode sets 130-1 and the upper electrode sets 130-2) achieves a wide viewing field state. Accordingly, in the wide viewing field state, each upper electrode set 130-1 functions as one receiver electrode and each upper electrode set 130-2 functions as one transmitter electrode.

In the wide viewing field state, the potentials of the lower electrode sets 160 relative to the upper electrode sets 130 have the polarity opposite to the charge of the electrophoretic particles. As a result, in a case where the charge of the electrophoretic particles is negative (−), the electrophoretic particles gather to the proximity of the electrode sets having the positive polarity; in the other case where the charge of the electrophoretic particles is positive (+), the electrophoretic particles gather to the proximity of the electrode sets having the negative polarity. The following description is based on an assumption that the charge of the electrophoretic particles is negative. If the charge of the electrophoretic particles is positive, the description is applicable by changing the polarities of the electrode sets to the opposite ones.

[Control]

Figure 7:
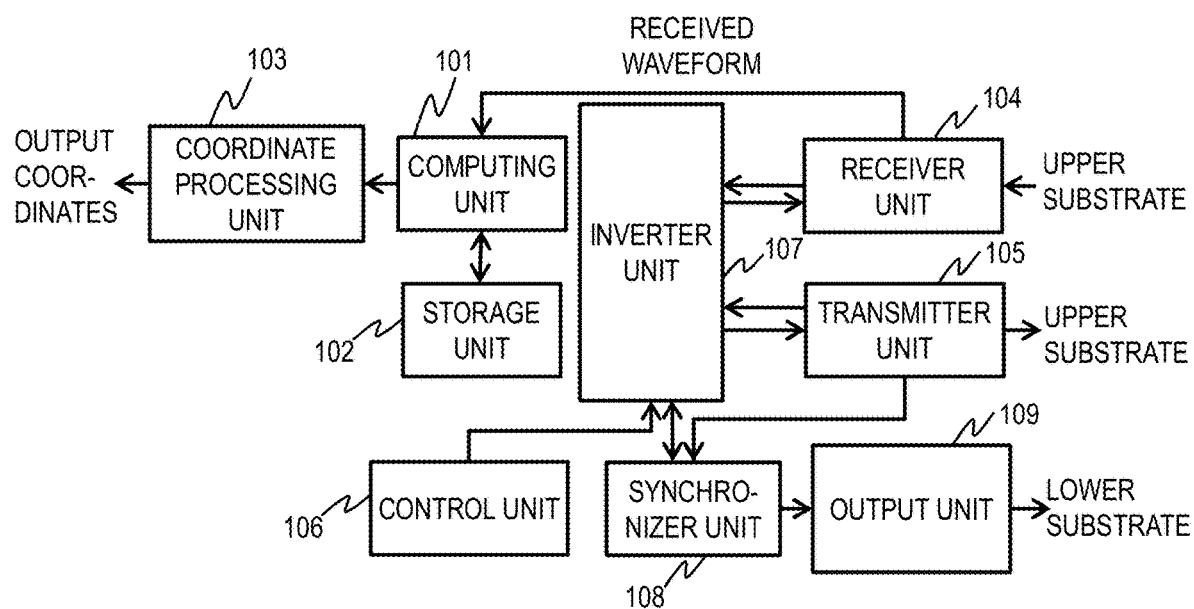
FIG. 7 is a block diagram schematically illustrating a configuration example of a driver according to Embodiment 1.

Hereinafter, control of the touch panel 1 by the driver 100 is described. FIG. 7 is a block diagram schematically illustrating a configuration example of the driver 100. As described above, the touch panel 1 has a touch panel function and a light distribution control function. To provide the two functions, the driver 100 includes a computing unit 101, a storage unit 102, a coordinate processing unit 103, a receiver unit 104, a transmitter unit 105, a control unit 106, an inverter unit 107, a synchronizer unit 108, and an output unit 109.

The storage unit 102 is a storage device such as a static random access memory (SRAM), a dynamic random access memory (DRAM), or a flash memory. Except for the storage unit 102, the units in the driver 100 are configured with a processor operating in accordance with a program and/or a logical circuit having a specific function. These units can be configured with separate circuits; a part or all of the units may share the same circuit (including the processor).

The computing unit 101 determines occurrence of a touch and the coordinates of the touch based on the waveforms received at the upper electrode sets 130 working as receiver electrodes. The storage unit 102 holds information indicating rounded waveforms to be described later. The coordinate processing unit 103 outputs the coordinates of a touch. The receiver unit 104 receives signals received by the upper electrode sets 130 working as receiver electrodes.

The transmitter unit 105 sends (provides) driving signals to the upper electrode sets 130. The control unit 106 determines whether the touch panel 1 is to be in a narrow viewing field state or a wide viewing field state.

The inverter unit 107 interchanges the driving signals generated for the upper electrode sets 130-1 with the driving signals generated for the upper electrode sets 130-2. The inverter unit 107 further interchanges the driving signals generated for the lower electrode sets 160-1 with the driving signals generated for the lower electrode sets 160-2. The synchronizer unit 108 synchronizes driving signals to be sent to individual electrodes. The output unit 109 sends driving signals to the lower electrodes 16.

Figure 8:
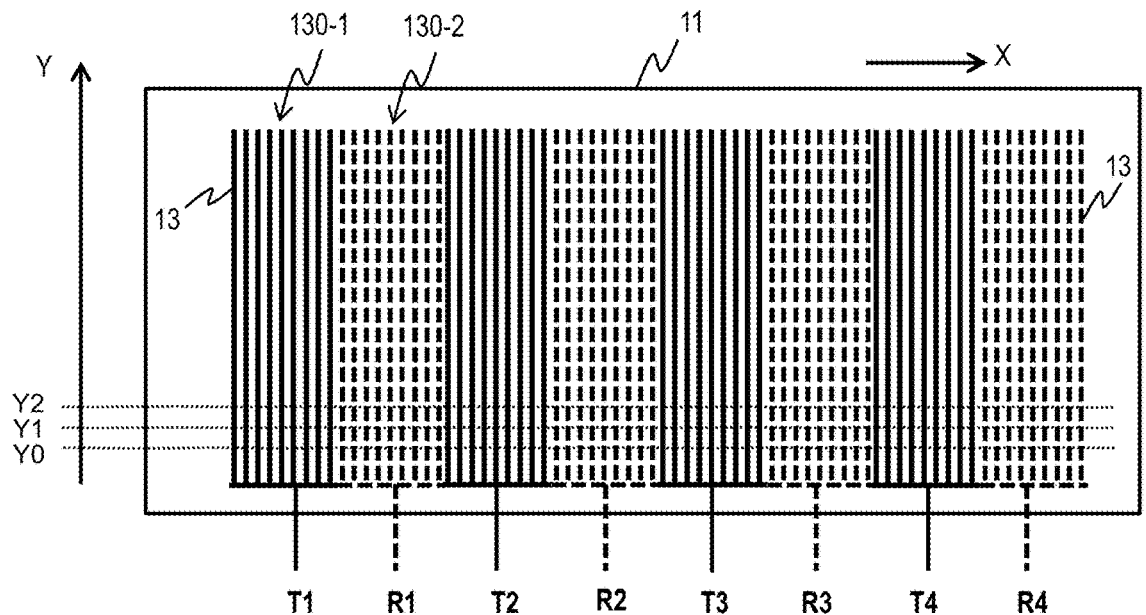
FIG. 8 is a plan diagram schematically illustrating a configuration example of the upper substrate of a touch panel in a narrow viewing field state according to Embodiment 1.

Hereinafter, an example of a method of detecting a touch point of a pointer in this embodiment is described. FIG. 8 is a plan diagram schematically illustrating a configuration example of the upper substrate 11 of a touch panel 1 in a narrow viewing field state. A capacitor (intersection capacitor) is configured at each intersection between an upper electrode set 130 working as a transmitter electrode and an upper electrode set 130 working as a receiver electrode (or the interface between an upper electrode set 130-1 and an upper electrode set 130-2). Accordingly, the coordinate processing unit 103 detects a touch point of a pointer in the X-axis direction by detecting an interface where the capacitance has decreased.

Figure 9:
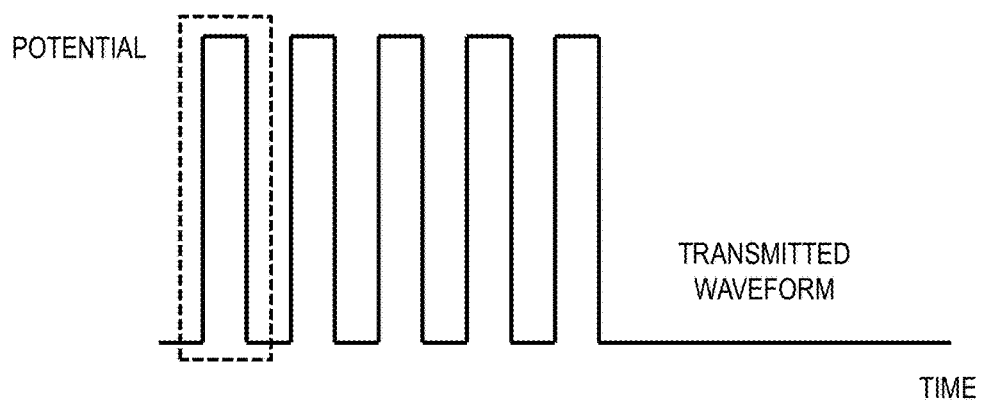
FIG. 9 is an explanatory diagram providing an example of a wave sent from an upper electrode set working as a transmitter electrode according to Embodiment 1.

FIG. 9 is an explanatory diagram providing an example of a wave sent from an upper electrode set 130 working as a transmitter electrode (hereinafter, also simply referred to as transmitter electrode). This transmitted wave is a rectangular wave including pulses having a predetermined height and a predetermined width.

Figure 10:
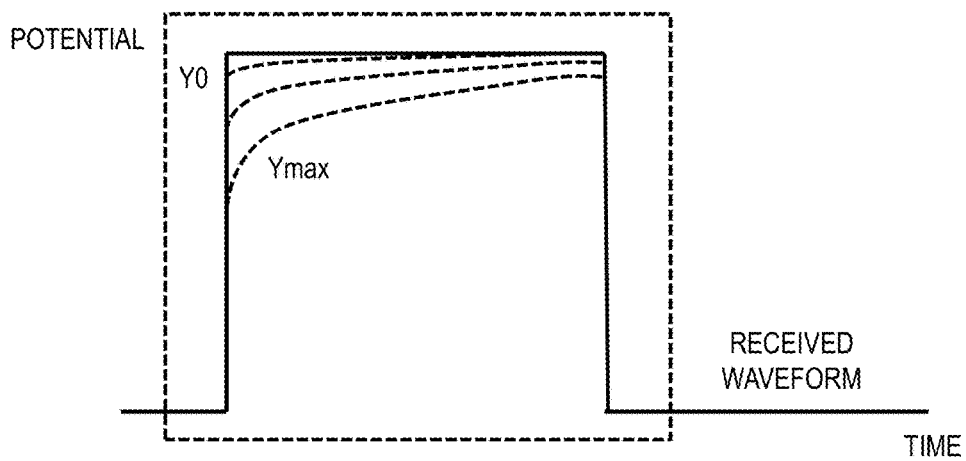
FIG. 10 is an explanatory diagram providing examples of a pulse received by an upper electrode set working as a receiver electrode according to Embodiment 1.

FIG. 10 is an explanatory diagram providing examples of a pulse received by an upper electrode set 130 working as a receiver electrode (hereinafter, also simply referred to as receiver electrode). The region surrounded by the dashed line in FIG. 10 provides enlarged received pulses in response to the transmitted pulse surrounded by the dashed line in FIG. 9. When the Y-coordinate of the touch point of a pointer is greater, the waveform of the pulse becomes rounded (meaning that the pulse indicates a slow rise and a small amplitude) on the transmission path to change the waveform to be received.

For example, the storage unit 102 holds functions representing the rounded waveforms for individual Y-coordinate values (Y0, Y2, . . . and Ymax) in advance. The computing unit 101 determines whether a pulse in a wave received by the receiver unit 104 includes rounding components. If determining that the pulse includes rounding components, the computing unit 101 compares the pulse waveform with each function held by the storage unit 102 to determine that the Y-coordinate value associated with the function most analogous to the pulse waveform is the Y-coordinate of the touch point of the pointer. The function most analogous to the pulse waveform can be the function located at the smallest Euclidian distance from the function representing the pulse waveform among the plurality of functions held by the storage unit 102.

Alternatively, the storage unit 102 may hold rise times of rounded waveforms for individual Y-coordinate values (Y0, Y2, . . . and Ymax) in advance. The rise time is a time from the time when the rounded waveform starts rising until the time when the waveform reaches a specific rate (for example 50%) of the height of a pulse in the transmitted wave. If determining that the pulse includes rounding components, the computing unit 101 determines the Y-coordinate value associated with the rise time having the smallest difference from the rise time of the pulse waveform of the received wave among the rise times held by the storage unit 102 is the Y-coordinate of the touch point of the pointer.

Figure 11A:
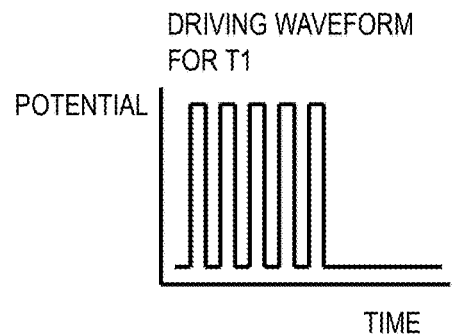
FIG. 11A provides a waveform of driving potential given to the upper electrode sets in the narrow viewing field state according to Embodiment 1.

Hereinafter, an example of a method of driving the electrodes in the narrow viewing field state is described. FIG. 11A provides a waveform of the driving potential (driving signal) given to the upper electrode sets 130-1 in the narrow viewing field state. In the example of FIG. 11A, the upper electrode sets 130-1 are provided with a driving signal of a rectangular wave including pulses having a predetermined height and a predetermined width. As described above, each of the upper electrode sets 130-1 in a narrow viewing field state functions as one transmitter electrode of the touch panel. In the narrow viewing field state, the driving potential to be given to the upper electrode sets 130-1 can have any waveform: a waveform appropriate for the touch panel 1 to detect a touch is selected.

Figure 11B:
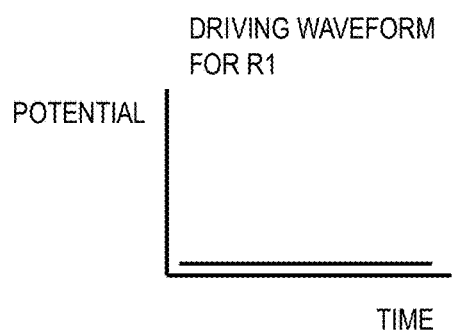
FIG. 11B provides a waveform of driving potential given to the upper electrode sets in the narrow viewing field state according to Embodiment 1.

FIG. 11B provides a waveform of the driving potential (driving signal) given to the upper electrode sets 130-2 in the narrow viewing field state. In the example of FIG. 11B, the upper electrode sets 130-2 are provided with a constant reference potential (for example, the ground potential). As described above, each of the upper electrode sets 130-2 in a narrow viewing field state functions as one receiver electrode of the touch panel.

Figure 11C:
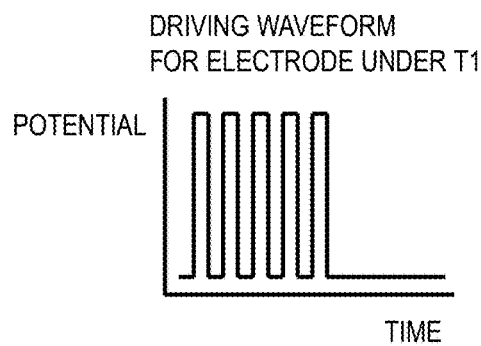
FIG. 11C provides a waveform of driving potential given to the lower electrode sets in the narrow viewing field state according to Embodiment 1.

FIG. 11C provides a waveform of the driving potential (driving signal) given to the lower electrode sets 160-1 in the narrow viewing field state (or the lower electrode sets 160 opposed to the transmitter electrodes in the narrow viewing field state). In the example of FIG. 11C, the lower electrode sets 160-1 are provided with a driving signal having the same phase and waveform as the driving signal for the upper electrode sets 130-1. Alternatively, the lower electrode sets 160-1 may be provided with a signal at a constant voltage (the average voltage in the rectangular wave given to the upper electrode sets 130-1 so that each transmitter electrode will have the same potential as the electrode opposed to the transmitter electrode).

Figure 11D:
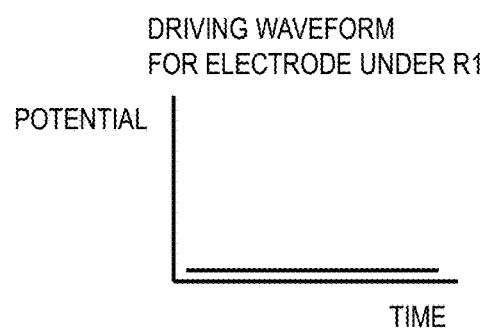
FIG. 11D provides a waveform of driving potential given to the lower electrode sets in the narrow viewing field state according to Embodiment 1.

FIG. 11D provides a waveform of the driving potential (driving signal) given to the lower electrode sets 160-2 in the narrow viewing field state (or the lower electrode sets 160 opposed to the receiver electrodes in the narrow viewing field state). In the example of FIG. 11D, the lower electrode sets 160-2 are provided with the same constant reference signal (for example, the ground potential) as the one given to the upper electrode sets 130-2.

An example of the control of sending and receiving driving signals between the driver 100 and the electrodes in the narrow viewing field state is described. In the narrow viewing field state, the controller 106 has sent an instruction to effect a narrow viewing field state to the inverter unit 107. For example, the transmitter unit 105 generates the above-described driving signal of a rectangular wave for the upper electrode sets 130-1 and generates the above-described driving signal at a constant reference potential for the upper electrode sets 130-2 and send them to the inverter unit 107.

The inverter unit 107 in receipt of an instruction to effect a narrow viewing field state selects the upper electrode sets 130-1 one by one and sends the driving signal for the upper electrode sets 130-1 to the selected upper electrode set 130-1. The inverter unit 107 in receipt of an instruction to effect a narrow viewing field state also sends the driving signal for the upper electrode sets 130-2 to the upper electrode sets 130-2.

The receiver unit 104 receives waveforms received at the upper electrode sets 130 and sends them to the inverter unit 107. The inverter unit 107 sends the waveforms received at the upper electrode sets 130-2 of receiver electrodes to the computing unit 101 using the receiver unit 104, for example.

The inverter unit 107 in receipt of an instruction to effect a narrow viewing field state further sends the driving signal for the upper electrode sets 130-1 to the synchronizer unit 108. The synchronizer unit 108 sends the received driving signal to the output unit 109 in synchronization with the driving signal to be sent to the selected upper electrode set 130-1. The output unit 109 sends the received driving signal to the associated lower electrode set 160-1.

The inverter unit 107 in receipt of an instruction to effect a narrow viewing field state also sends the driving signal for the upper electrode sets 130-2 to the output unit 109 through the synchronizer unit 108. The output unit 109 sends the received driving signal to the lower electrode sets 160-2.

Providing the driving potentials in FIGS. 11A to 11D makes both ends of each electrophoretic element 14 sandwiched between opposed electrodes have the same potential. Accordingly, the colored electrophoretic particles become substantially uniformly dispersed in the dispersion medium, achieving a narrow viewing field state.

Figure 12A:
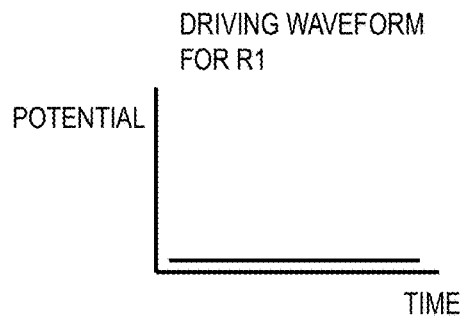
FIG. 12A provides a waveform of driving potential given to the upper electrode sets in the wide viewing field state according to Embodiment 1.

Hereinafter, an example of a method of driving the electrodes in the wide viewing field state is described. FIG. 12A provides a waveform of the driving potential (driving signal) given to the upper electrode sets 130-1 in the wide viewing field state. In the example of FIG. 12A, the upper electrode sets 130-1 are provided with a constant reference potential (for example, the ground potential). As described above, each of the upper electrode sets 130-1 in a wide viewing angle state functions as one receiver electrode of the touch panel.

Figure 12B:
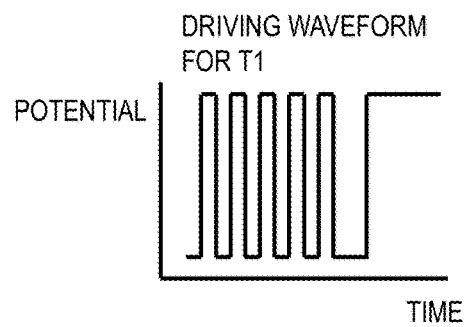
FIG. 12B provides a waveform of driving potential given to the upper electrode sets in the wide viewing field state according to Embodiment 1.

FIG. 12B provides a waveform of the driving potential (driving signal) given to the upper electrode sets 130-2 in the wide viewing field state. In the example of FIG. 12B, the upper electrode sets 130-2 are provided with a driving signal of a rectangular wave including pulses having a predetermined height and a predetermined width. As described above, each of the upper electrode sets 130-2 in the wide viewing field state functions as one transmitter electrode of the touch panel.

In the wide viewing field state, the driving potential to be given to the upper electrode sets 130-2 can have any waveform: a waveform appropriate for the touch panel 1 to detect a touch is selected. Meanwhile, in the wide viewing field state, the upper electrode sets 130-2 may be provided with a discharge period after receipt of a driving signal of a rectangular wave, as illustrated in FIG. 12B.

Figure 12C:
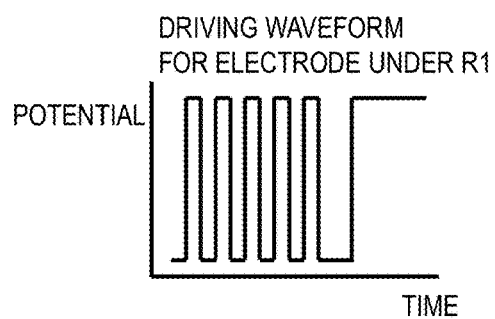
FIG. 12C provides a waveform of driving potential given to the lower electrode sets according to Embodiment 1.

FIG. 12C provides a waveform of the driving potential (driving signal) given to the lower electrode sets 160-1 (or the lower electrode sets 160 opposed to the receiver electrodes in the wide viewing field state). In the example of FIG. 12C, the lower electrode sets 160-1 are provided with a driving signal of a rectangular wave including pulses having a predetermined height (which is higher than the potential given to the upper electrode sets 130-1) and a predetermined width (for example, the driving signal same as the one given to the upper electrode sets 130-2). Alternatively, the lower electrode sets 160-1 may be provided with a constant reference potential higher than the potential given to the upper electrode sets 130-1.

Figure 12D:
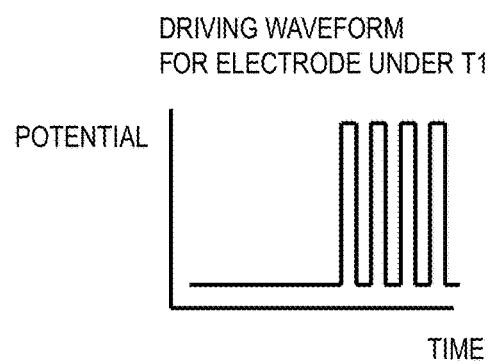
FIG. 12D provides a waveform of driving potential given to the lower electrode sets according to Embodiment 1.

FIG. 12D provides a waveform of the driving potential (driving signal) given to the lower electrode sets 160-2 (or the lower electrode sets 160 opposed to the transmitter electrodes in the wide viewing field state). In the example of FIG. 12D, the lower electrode sets 160-2 are provided with a constant reference signal (for example, the ground potential). In the discharge period of the upper electrode sets 130-2 in the wide viewing field state, the lower electrode sets 160-2 may be provided with a driving signal of a rectangular wave including pulses having a predetermined height and a predetermined width.

An example of the control of sending and receiving driving signals between the driver 100 and the electrodes in the wide viewing field state is described. In the wide viewing field state, the controller 106 has sent an instruction to effect a wide viewing field state to the inverter unit 107. For example, the transmitter unit 105 generates the above-described driving signal of a rectangular wave for the upper electrode sets 130-1 and generates the above-described driving signal at a constant reference potential for the upper electrode sets 130-2 and send them to the inverter unit 107, like in the narrow viewing field state.

The inverter unit 107 in receipt of an instruction to effect a wide viewing field state sends the driving signal for the upper electrode sets 130-2 in the narrow viewing field state (that is, a driving signal at a constant reference potential) to the upper electrode sets 130-1. The inverter unit 107 in receipt of an instruction to effect a wide viewing field state also sends the driving signal for the upper electrode sets 130-1 in the narrow viewing field state (that is, a driving signal of a rectangular wave) to the upper electrode sets 130-2.

The receiver unit 104 receives waveforms received at the upper electrode sets 130 and sends them to the inverter unit 107. The inverter unit 107 sends the waveforms received at the upper electrode sets 130-1 of receiver electrodes to the computing unit 101 using the receiver unit 104, for example.

As to the control in sending driving signals to the lower electrode sets 160 in the wide viewing field state can be the same as that in the narrow viewing field state.

Providing the driving potentials in FIGS. 12A to 12D makes the lower electrode sets 160-1 have higher potentials than the upper electrode sets 130-1 and makes the upper electrode sets 130-2 have higher potentials than the lower electrode sets 160-2. Accordingly, the colored electrophoretic particles are collected to the proximity of the lower electrode sets 160-1 and the upper electrode sets 130-2 to achieve a wide viewing field state.

As set forth above, the upper electrode sets 130 in the touch panel 1 in this embodiment function as electrodes for a touch panel device and electrodes for controlling the light distribution. Accordingly, the touch panel 1 in this embodiment attains high transmittance and a thin structure, compared to a touch panel having electrodes for a touch panel device separately from the electrodes for controlling the light distribution. Furthermore, the process of bonding the electrodes is reduced, which leads to cost reduction.

The touch panel 1 determines that a touch of a pointer has occurred when the pointer touches both of an upper electrode set 130-1 and an upper electrode set 130-2 adjacent to the upper electrode set 130-1. In other words, to determine occurrence of a touch, a touch across two adjacent upper electrode sets 130 is required. For this reason, erroneous operations caused by a waterdrop, for example, occur with low frequency.

Furthermore, providing electrodes on the lower substrate 17 reduces the noise from the display panel 5 such as a liquid crystal display panel to the touch panel 1.

The controller 106 may separate the lower electrode sets 160 into groups in controlling them. In other words, a part of the lower electrode sets 160 may be provided with the above-described driving potentials for the narrow viewing field state or the wide viewing field state. This configuration enables only a part of the X-Y plane of the touch panel 1 to be used as light distribution control elements. According to this embodiment, total thickness of the touch panel and the viewing angle control device can be reduced.

Embodiment 2

Figure 13:
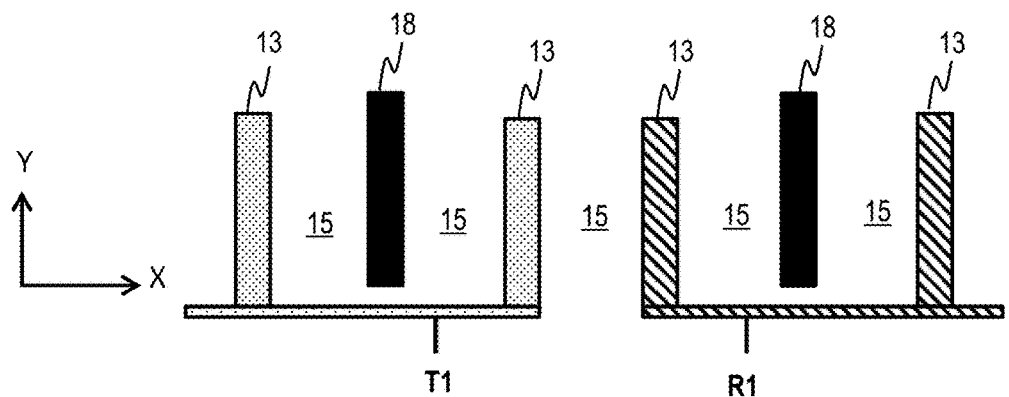
FIG. 13 is an enlarged diagram schematically illustrating a configuration example of an oval region surrounded by a dashed line in FIG. 2 according to Embodiment 2.

The following embodiments are described in differences from Embodiment 1. FIG. 13 is an enlarged diagram schematically illustrating a configuration example of the region surrounded by a dashed line in FIG. 2. In this embodiment, a part of the electrodes in an upper electrode set 130 is separate from the upper electrode set 130 to only have the function of a third electrode for controlling the light distribution.

In a specific example, each upper electrode set 130 is composed of 100 upper electrodes 13 and third electrodes 18 are provided in parallel to the upper electrodes 13 in the middle between upper electrodes 13. For example, the distance between an upper electrode 13 and a third electrode 18 is 5 μm.

Figure 14:
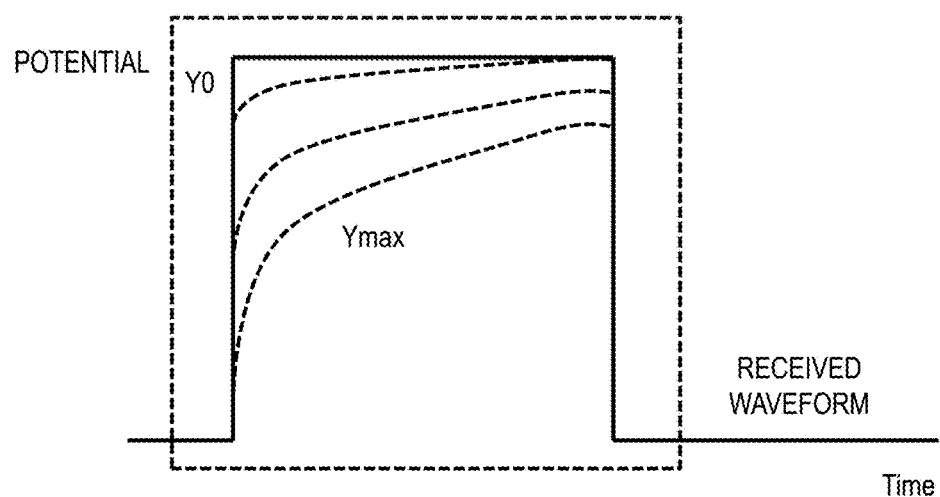
FIG. 14 is an explanatory diagram providing examples of a pulse received by an upper electrode set as a receiver electrode according to Embodiment 2.

FIG. 14 is an explanatory diagram providing examples of a pulse received by an upper electrode set 130 as a receiver electrode. The region surrounded by the dashed line in FIG. 14 provides enlarged received pulses in response to the transmitted pulse surrounded by the dashed line in FIG. 9.

Compared to the upper electrode set 130 in Embodiment 1, the upper electrode set 130 in this embodiment has a small number of upper electrodes 13 and these upper electrodes 13 are distant from one another; the resistive component on the transmission path is large. Accordingly, the waveforms of a pulse are rounded more than the waveforms of the examples in FIG. 10. As a result, the accuracy in detecting the touch point in the Y-coordinates increases. To increase the accuracy in detecting a touch point, it is preferable that the number of upper electrodes 13 be not more than 200 and the distance between upper electrodes 13 be not less than 20 μm (and not more than 100 μm). It should be noted that the touch panel 1 does not have to include electrodes only having the function of controlling the light distribution, if the upper electrode sets 130 therein includes a smaller number of upper electrodes 13 and a larger distance between upper electrodes 13 than the distance between upper electrodes 13 in the upper electrode sets 130 in Embodiment 1.

Embodiment 3

Figure 15:
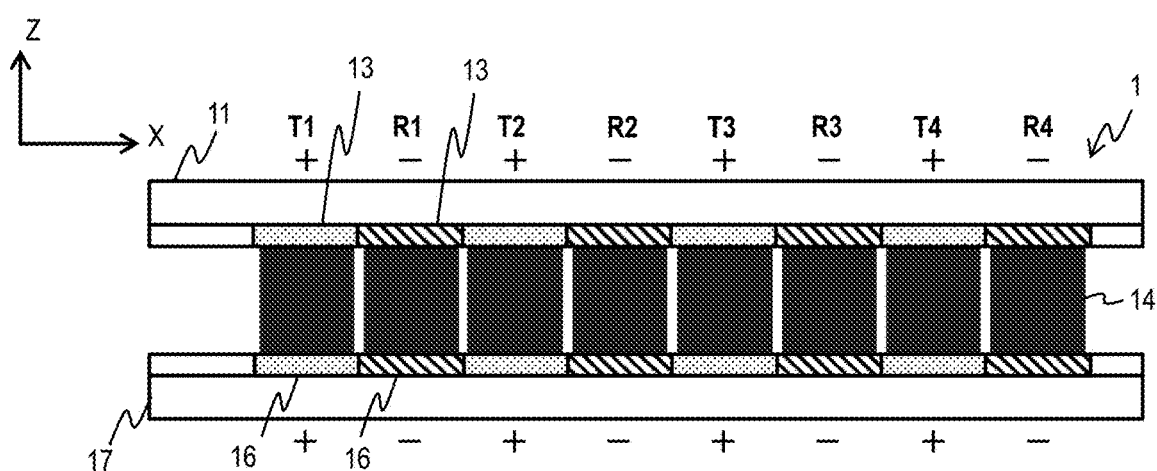
FIG. 15 is a cross-sectional diagram schematically illustrating a configuration example of a touch panel in a narrow viewing field state according to Embodiment 3.
Figure 16:
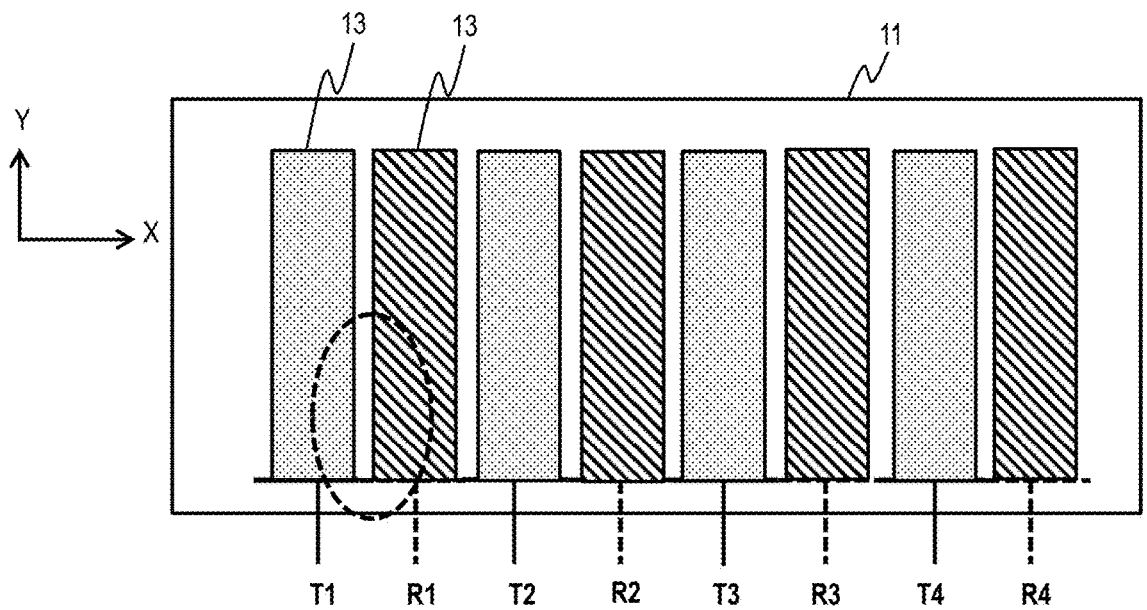
FIG. 16 is a plan diagram schematically illustrating a configuration example of the upper substrate of the touch panel in the narrow viewing field state according to Embodiment 3.
Figure 17:
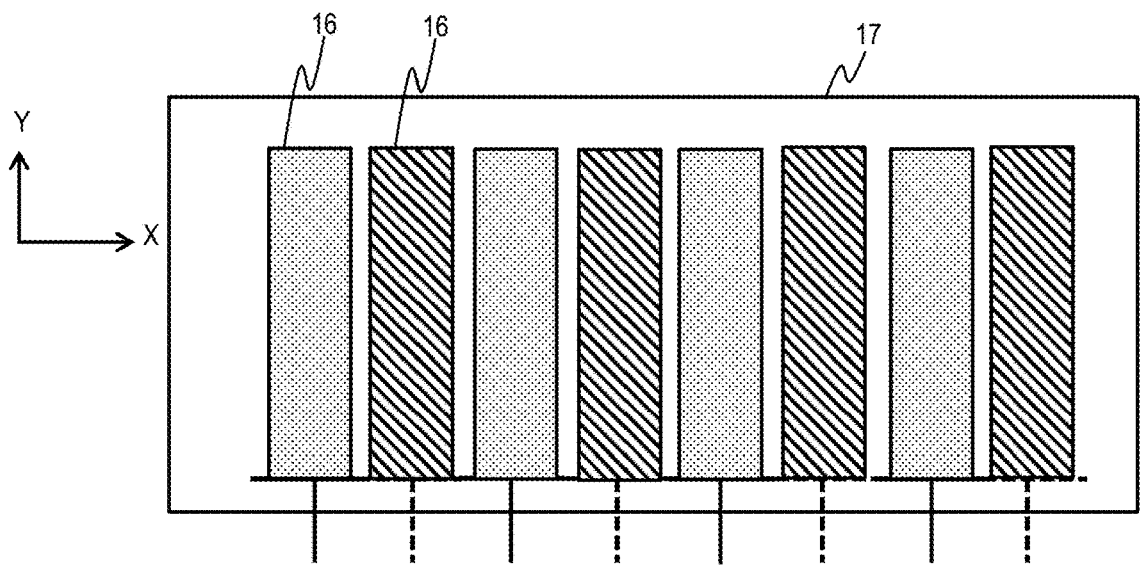
FIG. 17 is a plan diagram schematically illustrating a configuration example of the lower substrate of the touch panel according to Embodiment 3.
Figure 18:
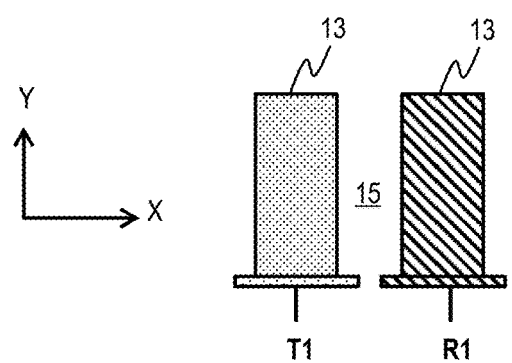
FIG. 18 is an enlarged diagram schematically illustrating an oval region surrounded by a dashed line in FIG. 16 according to Embodiment 3.

FIG. 15 is a cross-sectional diagram schematically illustrating a configuration example of a touch panel 1 in a narrow viewing field state. FIG. 16 is a plan diagram schematically illustrating a configuration example of the upper substrate 11 of the touch panel 1 in the narrow viewing field state. FIG. 17 is a plan diagram schematically illustrating a configuration example of the lower substrate 17 of the touch panel 1. FIG. 18 is an enlarged diagram schematically illustrating the oval region surrounded by a dashed line in FIG. 16.

In the touch panel 1 in this embodiment, the upper electrodes 13 and the lower electrodes 16 are not bundled. In other words, each upper electrode set 130 is composed of one upper electrode 13 and each lower electrode set 160 is composed of one lower electrode 16. Since an upper electrode set 130 is composed of one upper electrode 13, the touch panel 1 in this embodiment can control the electrophoretic elements 14 individually.

Embodiment 4

Figure 19:
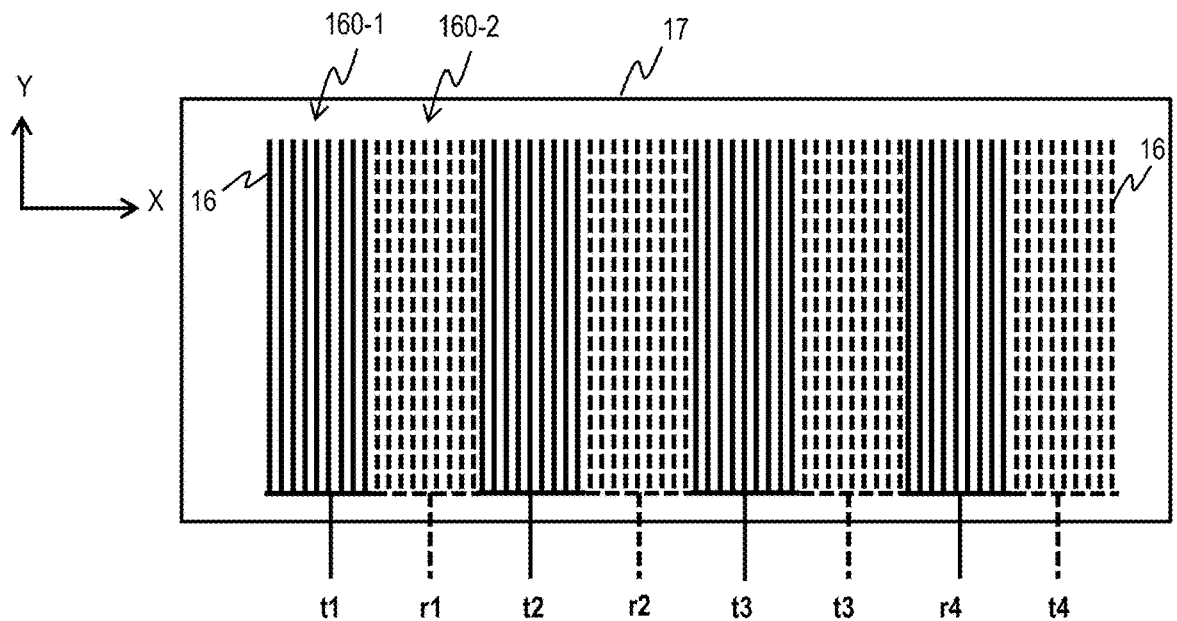
FIG. 19 is a plan diagram schematically illustrating a configuration example of the lower substrate of a touch panel according to Embodiment 4.

FIG. 19 is a plan diagram schematically illustrating a configuration example of the lower substrate 17 of a touch panel 1. In this embodiment, the lower electrode sets 160 are also used to sense the noise from the display panel 5 to the touch panel 1. In both of the narrow viewing field state and the wide viewing field state, each lower electrode set 160-1 controlled to have a high potential is used as one transmitter electrode for noise sensing and each lower electrode set 160-2 controlled to have a low potential is used as one receiver electrode for noise sensing.

Figure 20:
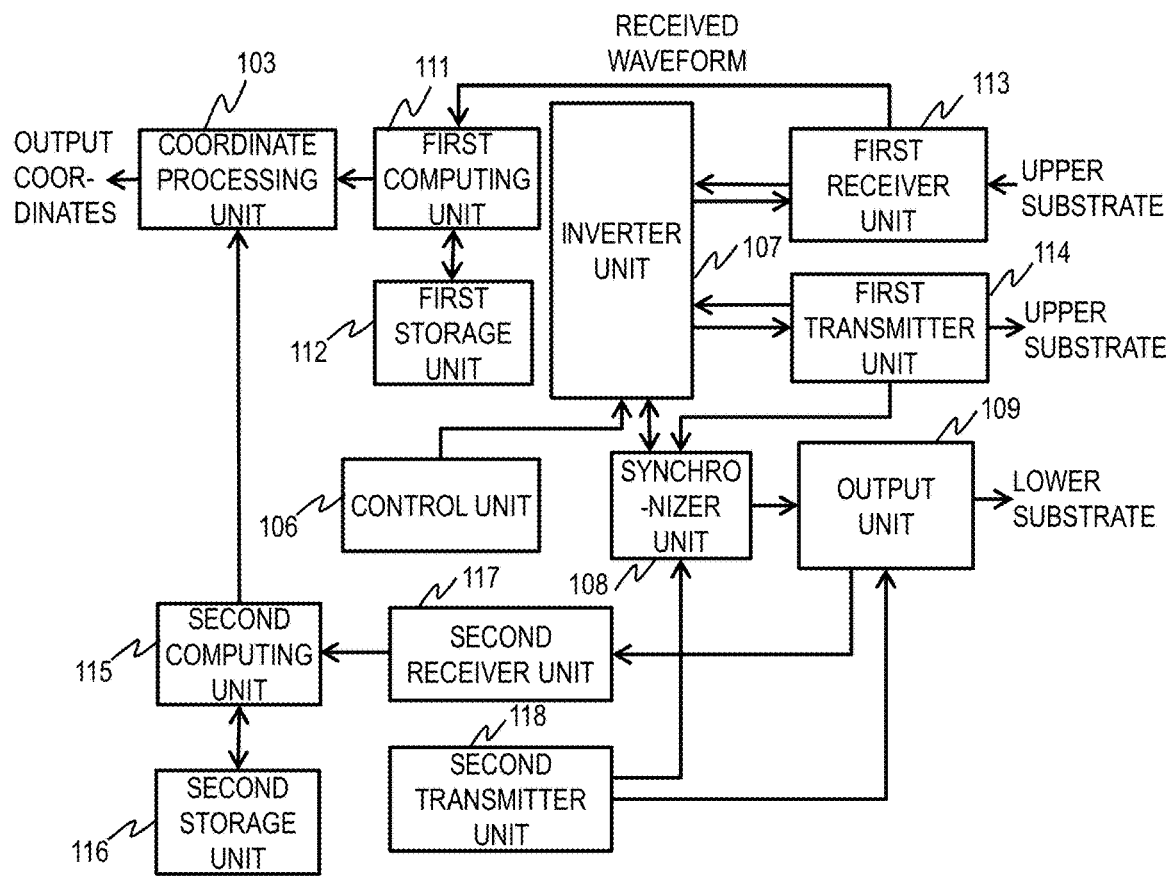
FIG. 20 is a block diagram schematically illustrating a configuration example of the driver according to Embodiment 4.

FIG. 20 is a block diagram schematically illustrating a configuration example of the driver 100. The driver 100 in this embodiment includes a first computing unit 111, a first storage unit 112, a first receiver unit 113, a first transmitter unit 114, a second computing unit 115, a second storage unit 116, a second receiver unit 117, and a second transmitter unit 118, in place of the computing unit 101, the storage unit 102, the receiver unit 104, and the transmitter unit 105 in Embodiment 1.

The description of the computing unit 101, the storage unit 102, the receiver unit 104, and the transmitter unit 105 applies to the first computing unit 111, the first storage unit 112, the first receiver unit 113, and the first transmitter unit 114, respectively and therefore, description of these is omitted herein.

The second storage unit 116 is a storage device such as a static random access memory (SRAM), a dynamic random access memory (DRAM), or a flash memory. Except for the first storage unit 112 and the second storage unit 116, the units in the driver 100 are configured with a processor operating in accordance with a program and/or a logical circuit having a specific function. These units can be configured with separate circuits; a part or all of the units may share the same circuit (including the processor).

The second computing unit 115 detects noise in the waveform received at the lower electrode sets 160 working as receiver electrodes. The second receiver unit 117 receives signals received at the lower electrodes 16 working as receiver electrodes. The second transmitter unit 118 sends driving signals to the lower electrode sets 160 through the synchronizer unit 108 and the output unit 109.

Figure 21:
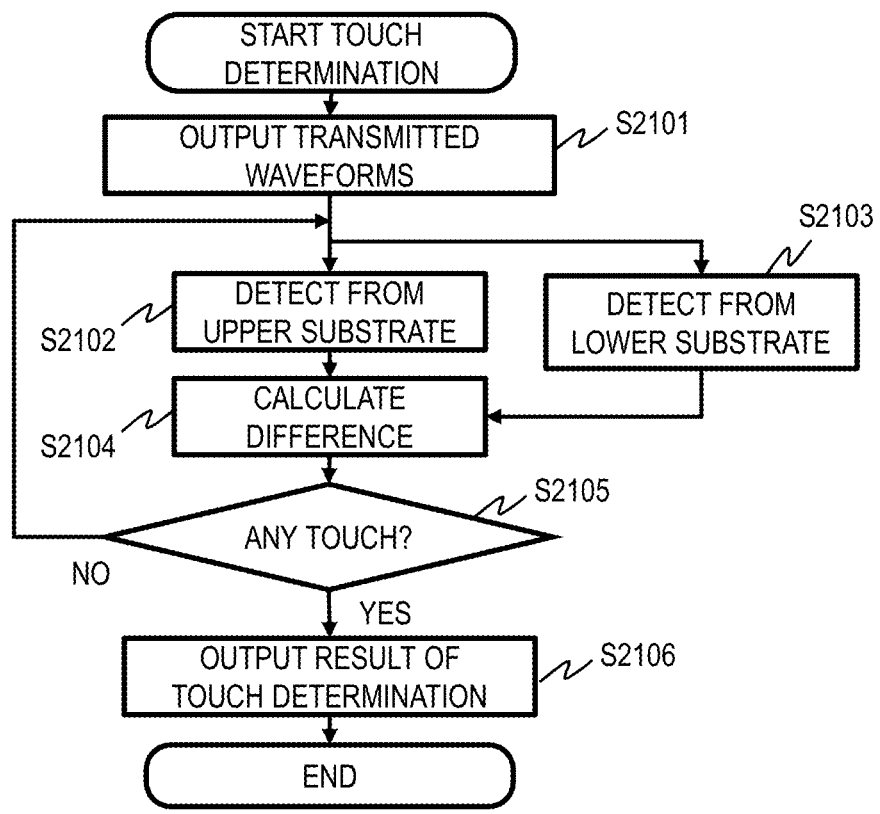
FIG. 21 is a flowchart of an example of touch determination processing according to Embodiment 4.

FIG. 21 is a flowchart of an example of touch determination processing. Each upper electrode set 130 working as a receiver electrode receives a wave sent from an upper electrode set 130 working as a transmitter electrode and each lower electrode set 160 working as a receiver electrode receives a wave sent from a lower electrode set 160 working as a transmitter electrode (S2101). The first receiver unit 113 receives the waves received from the upper electrode sets 130 working as receiver electrodes and generates a waveform of the received waves (S2102). The second receiver unit 117 receives the waves received from the lower electrode sets 160 working as receiver electrodes and generates a waveform of the received waves (S2103).

The coordinate processing unit 103 receives the waveform received at the upper electrode sets 130 working as receiver electrodes from the first receiver unit 113 and further receives the waveform received at the lower electrode sets 160 working as receiver electrodes from the second receiver unit 117 and calculates the difference waveform between these two waveforms (S2104).

The coordinate processing unit 103 determines whether a touch has occurred and the coordinates of the touch based on the difference waveform and the information on the rounded waveforms the first computing unit 111 acquires from the first storage unit 112 (S2105). If the coordinate processing unit 103 determines that no touch has occurred (S2105: NO), the processing returns to Steps S2102 and S2103. If the coordinate processing unit 103 determines that a touch has occurred (S2105: YES), the coordinate processing unit 103 outputs the position of the touch (S2106) and exits the touch determination processing.

Figure 22A:
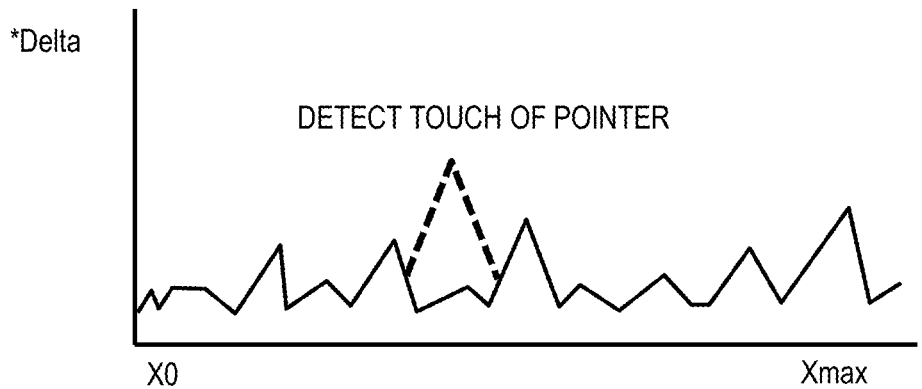
FIG. 22A provides examples of a waveform in the X-axis direction of waves received at upper electrode sets working as receiver electrodes according to Embodiment 4.
Figure 22B:
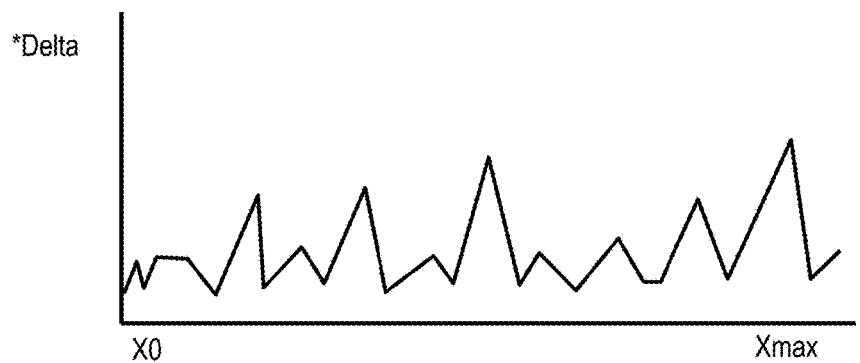
FIG. 22B provides an example of a waveform in the X-axis direction of waves received at lower electrode sets working as receiver electrodes according to Embodiment 4.
Figure 22C:
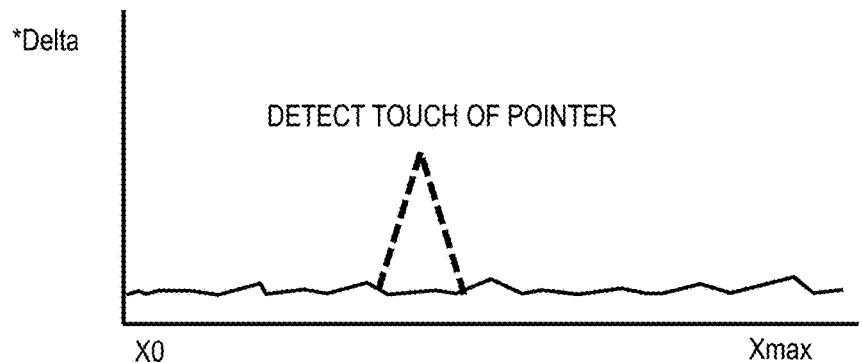
FIG. 22C provides examples of a waveform indicating difference between a waveform in the X-axis direction of waves received at the upper electrode sets working as receiver electrodes and a waveform in the X-axis direction of waves received at lower electrode sets working as receiver electrodes according to Embodiment 4.

FIG. 22A provides examples of a waveform in the X-axis direction of the waves received at upper electrode sets 130 working as receiver electrodes. FIG. 22B provides an example of a waveform in the X-axis direction of the waves received at lower electrode sets 160 working as receiver electrodes. FIG. 22C provides examples of a waveform indicating the difference between the waveform in the X-axis direction of the waves received at the upper electrode sets 130 working as receiver electrodes and the waveform in the X-axis direction of the waves received at lower electrode sets 160 working as receiver electrodes. In FIGS. 22A to 22C, the horizontal axis represents the X-coordinate and the vertical axis (*Delta) represents the amount of capacitance decreased from the reference capacitance of the touch panel. In FIGS. 22A and 22C, the dashed lines represent the decrease in capacitance caused by a touch of a pointer and the solid lines represent the decrease in capacitance caused by noise.

The major cause of the decrease in capacitance in an upper electrode set 130 is more likely to be a touch of a pointer. On the other hand, the major cause of the decrease in capacitance in a lower electrode set 160 is likely to be noise radiated from the components such as the display panel 5. Although this noise attenuates in between the lower substrate 17 and the upper substrate 11, a substantially identical waveform is detected at the upper electrode set 130. However, decrease in capacitance caused by a touch of a pointer hardly occurs in a lower electrode set 160 because of interference by the electrophoretic elements 14 between the lower substrate 17 and the upper substrate 11.

Accordingly, calculating the difference at Step S2104 provides a waveform after the noise from the display panel 5 to the touch panel 1 is removed, as illustrated in FIG. 22C. This configuration increases the accuracy in determining the occurrence of a touch and detecting a touch point in good conformity with the level of noise.

Embodiment 5

Figure 23:
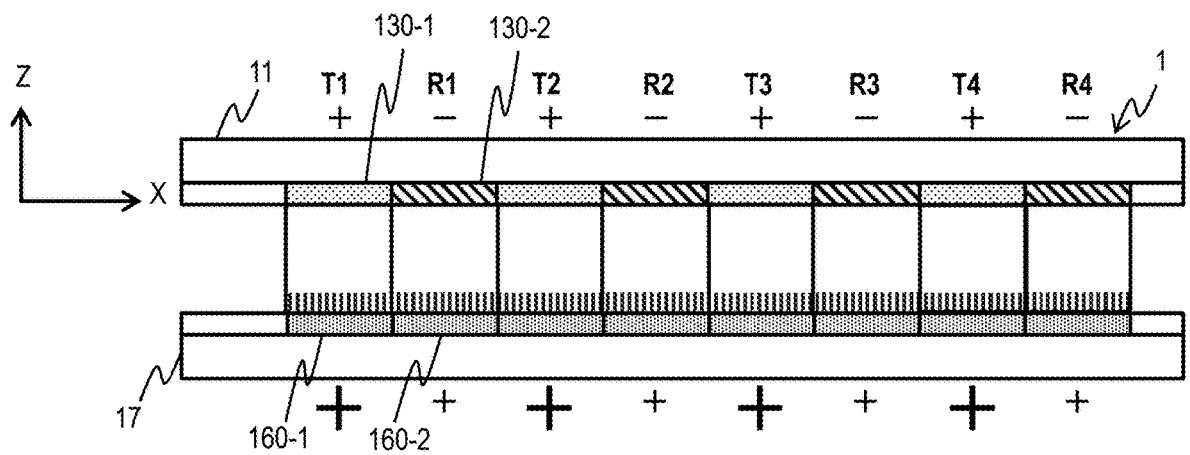
FIG. 23 is a cross-sectional diagram schematically illustrating a configuration example of a touch panel in a wide viewing field state according to Embodiment 5.
Figure 24:
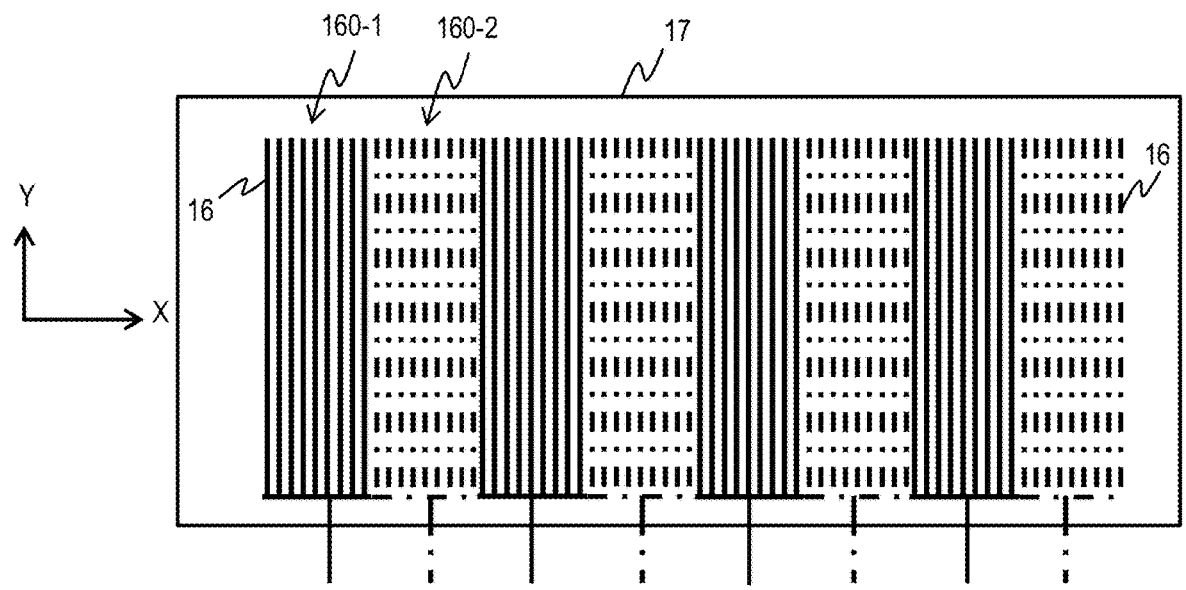
FIG. 24 is a plan diagram schematically illustrating a configuration example of the lower substrate of the touch panel in the wide viewing field state according to Embodiment 5.

FIG. 23 is a cross-sectional diagram schematically illustrating a configuration example of a touch panel 1 in a wide viewing field state. FIG. 24 is a plan diagram schematically illustrating a configuration example of the lower substrate 17 of the touch panel 1 in the wide viewing field state.

The control in a narrow viewing field state in Embodiment 1 applies to the touch panel 1 of this embodiment in a narrow viewing field state. That is to say, the upper electrode sets 130-1 and the lower electrode set 160-1 are controlled to have the same potential (for example, high potential) and the upper electrode sets 130-2 and the lower electrode set 160-2 are controlled to have the same potential (for example, low potential) in the narrow viewing field state.

In a wide viewing field state, the touch panel 1 in this embodiment is controlled so that the lower electrode sets 160-2 have a high potential like in Embodiment 1 and the lower electrode sets 160-1 have a potential higher than the high potential in the narrow viewing field state. As a result, the electrophoretic particles in the electrophoretic elements 14 gather to the proximity of the lower electrode sets 160-1 and 160-2. This means that the touch panel 1 in this embodiment is switchable between the narrow viewing field state and the wide viewing field state without changing the driving potentials for the upper electrode sets 130. In FIG. 24, the electrodes controlled to have relatively high potentials are indicated by solid lines and the electrodes controlled to have relatively low potentials are indicated by dashed-dotted lines.

Figure 25:
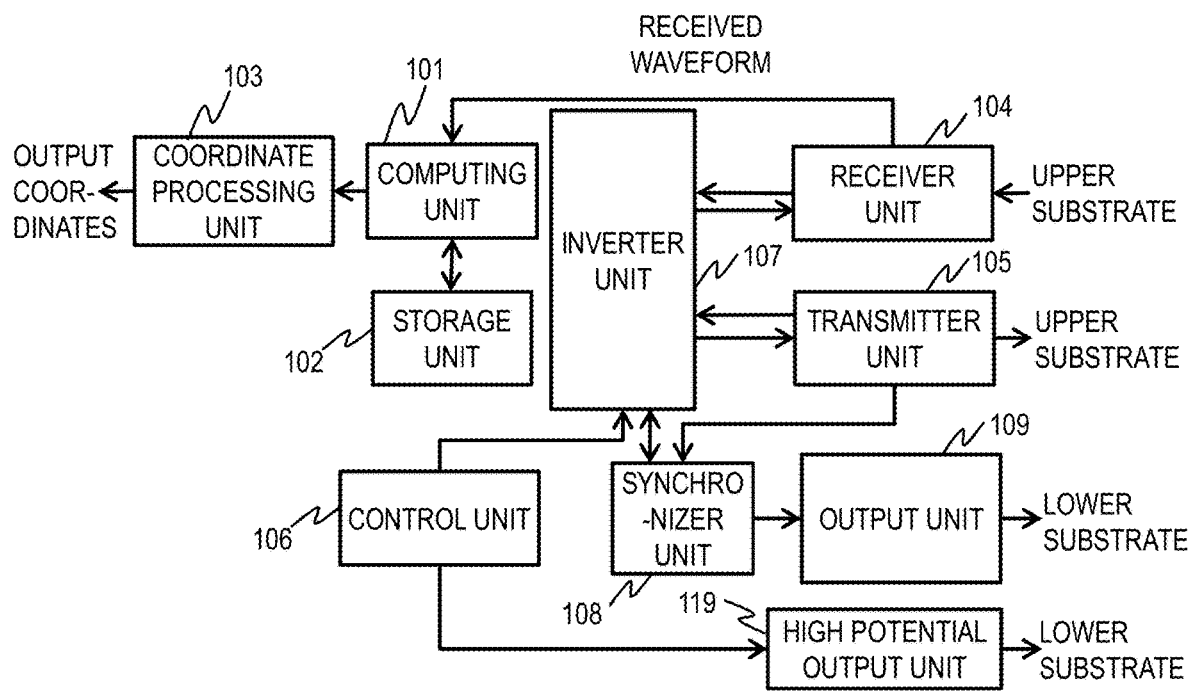
FIG. 25 is a block diagram schematically illustrating a configuration example of the driver according to Embodiment 5.

FIG. 25 is a block diagram schematically illustrating a configuration example of the driver 100. The driver 100 in this embodiment further includes a high potential output unit 119. The high potential output unit 119 in receipt of an instruction from the controller 106 to effect a wide viewing field state sends driving signals at a high potential to the lower electrode sets 160-1. Accordingly, the output unit 109 does not need to send driving signals to the lower electrode sets 160-1.

Figure 26A:
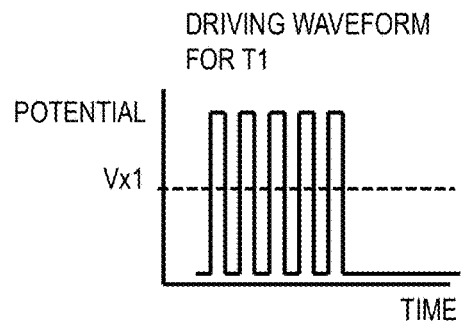
FIG. 26A provides a waveform of driving potential given to the upper electrode sets in the wide viewing field state according to Embodiment 5.

An example of a method of driving the electrodes in the wide viewing field state is described. FIG. 26A provides a waveform of the driving potential (driving signal) given to the upper electrode sets 130-1 in the wide viewing field state. The potential Vx1 in FIG. 26A is an average potential given to an upper electrode set 130-1. In the example of FIG. 26A, an upper electrode set 130-1 is provided with the same driving signal as the driving signal in the narrow viewing field state in Embodiment 1 (for example, a driving signal of a rectangular wave including pulses having a predetermined height and a predetermined width). Even in the wide viewing field state, each upper electrode set 130-1 functions as one transmitter electrode of the touch panel.

Figure 26B:
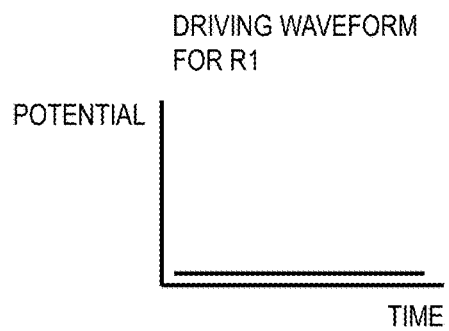
FIG. 26B provides a waveform of driving potential given to the upper electrode sets in the wide viewing field state according to Embodiment 5.

FIG. 26B provides a waveform of the driving potential (driving signal) given to the upper electrode sets 130-2 in the wide viewing field state. In the example of FIG. 26B, the upper electrode sets 130-2 are provided with the same driving signal as the driving signal in the narrow viewing field state in Embodiment 1 (for example, a constant reference potential (for example, the ground potential)). Even in the wide viewing field state, each upper electrode set 130-2 functions as one receiver electrode of the touch panel.

Figure 26C:
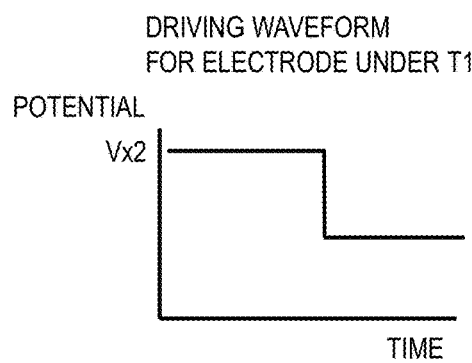
FIG. 26C provides a waveform of driving potential given to the lower electrode sets according to Embodiment 5.

FIG. 26C provides a waveform of the driving potential (driving signal) given to the lower electrode sets 160-1. In the example of FIG. 26C, the lower electrode sets 160-1 are provided with a constant potential Vx2.

Figure 26D:
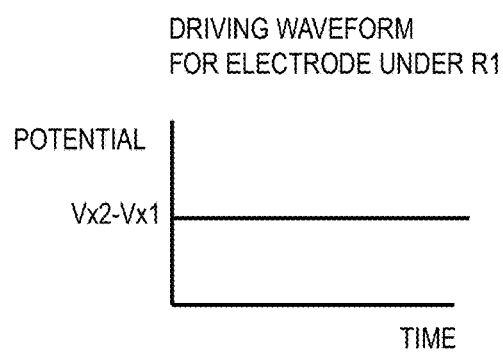
FIG. 26D provides a waveform of driving potential given to the lower electrode sets according to Embodiment 5.

FIG. 26D provides a waveform of the driving potential (driving signal) given to the lower electrode sets 160-2. In the example of FIG. 26D, the lower electrode sets 160-2 are provided with a constant potential that is higher than the reference potential given to the upper electrode sets 130-2. This constant potential can be Vx2−Vx1, for example. If the electrode sets are provided with the foregoing driving potentials simultaneously with switching from a narrow viewing field state to a wide viewing field state, the colored electrophoretic particles simultaneously gather toward the lower electrode sets 160 because the potential difference between the upper electrode sets 130-1 (the first potential: Vx1) and the lower electrode sets 160-1 (the third potential: Vx2) is equal to the potential difference between the upper electrode sets 130-2 (the second potential: ground potential) and the lower electrode sets 160-2 (the fourth potential: Vx2−Vx1).

Providing the driving potentials in FIGS. 26A to 26D makes the lower electrode sets 160-1 have higher potentials than the upper electrode sets 130-1 and the lower electrode sets 160-2 have higher potentials than the upper electrode sets 130-2. The colored electrophoretic particles gather to the proximity of the lower electrode sets 160-1 and the lower electrode sets 160-2 to achieve a wide viewing field state.

Embodiment 6

Figure 27:
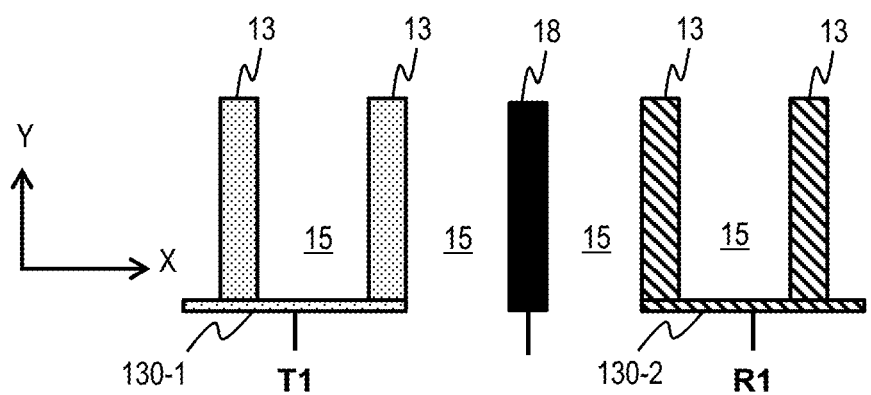
FIG. 27 is an enlarged cross-sectional diagram of a border between an upper electrode set and an upper electrode set according to Embodiment 6.

FIG. 27 is an enlarged cross-sectional diagram of the border between an upper electrode set 130-1 and an upper electrode set 130-2. The upper substrate 11 in this embodiment has a third electrode 18 between an upper electrode set 130-1 and an upper electrode set 130-2. The third electrode 18 does not function as an upper electrode but only as an electrode for controlling the light distribution.

Although not illustrated in the drawing, the lower substrate 17 has a lower electrode 16 at each place opposite to a third electrode 18. An electrophoretic element 14 is sandwiched by the third electrode 18 and the lower electrode 16 provided at the place opposite to the third electrode 18.

The width and the height of the third electrode 18 can be the same as those of the upper electrodes 13. The appropriate distance between an upper electrode set 130-1 and a third electrode 18 and the appropriate distance between an upper electrode set 130-2 and the third electrode 18 can be 1 to 150 μm, which is the same as the width of a light transmissive region 15, and in this embodiment, 20 μm.

In this embodiment, the output unit 109 additionally sends driving signals to the third electrodes 18. The third electrodes 18 and the lower electrodes 16 opposed to the third electrodes 18 may be driven separately from the upper electrode sets 130 and the lower electrode sets 160, respectively.

In other words, the third electrodes 18 do not need to be provided with the same potentials as the upper electrode sets 130. In similar, the lower electrodes 16 opposed to the third electrodes 18 do not need to be provided with the same potentials as the other lower electrodes 16.

Specifically, the control unit 106 may control the output unit 109 to maintain the third electrodes 18 and the lower electrodes 16 opposed to the third electrodes 18 at the same potentials in the narrow viewing field state. In the wide viewing field state, the control unit 106 controls the output unit 109 to generate a potential difference between each third electrode 18 and each lower electrode 16 opposed to the third electrode 18.

Since the distance between an upper electrode set 130-1 and an upper electrode set 130-2 in this embodiment is larger than that in Embodiment 1, the upper electrode sets 130 have higher sensitivity, achieving higher accuracy in detecting a touch of a pointer.

As set forth above, embodiments of this invention have been described; however, this invention is not limited to the foregoing embodiments. Those skilled in the art can easily modify, add, or convert each element in the foregoing embodiment within the scope of this invention. A part of the configuration of one embodiment can be replaced with a configuration of another embodiment or a configuration of an embodiment can be incorporated into a configuration of another embodiment.

What is claimed is:

1. A light distribution controllable touch panel device comprising:
   a plurality of upper electrodes;
   a plurality of lower electrodes;
   a plurality of electrophoretic elements sandwiched by the plurality of upper electrodes and the plurality of lower electrodes, each electrophoretic element of the plurality of electrophoretic elements including colored electrophoretic particles and dispersion medium; and
   a driver,
   wherein the plurality of upper electrodes include one or more first upper electrode sets and one or more second upper electrode sets, each set of the one or more first upper electrode sets and the one or more second upper electrode sets including one upper electrode or a plurality of upper electrodes connected by a conductor,
   wherein the one or more first upper electrode sets and the one or more second upper electrode sets are disposed alternately,
   wherein the driver is configured to:
      provide the one or more first upper electrode sets with driving potentials for detecting a touch point and measure potentials of the one or more second upper electrode sets or provide the one or more second upper electrode sets with driving potentials for detecting a touch point and measure potentials of the one or more first upper electrode sets, and
      provide the plurality of lower electrodes with driving potentials according to the driving potentials given to the plurality of upper electrodes to control the colored electrophoretic particles in the plurality of electrophoretic elements to be in a dispersed state or a collected state, and wherein, in a narrow viewing angle mode, the driver is configured to provide the plurality of lower electrodes with same potentials as the driving potentials given to the plurality of upper electrodes opposed to the plurality of lower electrodes to maintain the colored electrophoretic particles in the plurality of electrophoretic elements in the dispersed state.

2. The light distribution controllable touch panel device according to claim 1, wherein, in a wide viewing angle mode, the driver is configured to provide the plurality of lower electrodes with potentials having a predetermined difference from the driving potentials given to the upper electrodes opposed to the plurality of lower electrodes to maintain the colored electrophoretic particles in the plurality of electrophoretic elements in the collected state.

3. The light distribution controllable touch panel device according to claim 1, wherein the driver is configured to:
maintain the colored electrophoretic particles in the electrophoretic elements in the dispersed state in the narrow viewing angle mode and maintain the colored electrophoretic particles in the electrophoretic elements in the collected state in a wide viewing angle mode,
provide the one or more first upper electrode sets with the driving potentials and measure the potentials of the one or more second upper electrode sets in the narrow viewing angle mode, and
provide the one or more second upper electrode sets with the driving potentials and measure the potentials of the one or more second upper electrode sets in the wide viewing angle mode.

4. The light distribution controllable touch panel device according to claim 3,
wherein the plurality of lower electrodes include:
one or more first lower electrode sets each including lower electrodes opposed to upper electrodes in a first upper electrode set of the one or more first upper electrode sets and connected by a conductor, and
one or more second lower electrode sets each including lower electrodes opposed to upper electrodes in a second upper electrode set of the one or more second upper electrode sets and connected by a conductor, and
wherein the driver is configured to:
make the one or more first upper electrode sets and the one or more first lower electrode sets have a same potential and further make the one or more second upper electrode sets and the one or more second lower electrode sets have a same potential in the narrow viewing angle mode, and
make the one or more first upper electrode sets have potentials different from potentials of the one or more first lower electrode sets and further make the one or more second upper electrode sets have potentials different from potentials of the one or more second lower electrode sets in the wide viewing angle mode.

5. The light distribution controllable touch panel device according to claim 1,
wherein each set of the one or more first upper electrode sets and the one or more second upper electrode sets include upper electrodes of a number not more than a predetermined number, and wherein distance between upper electrodes in each set of the one or more first upper electrode sets and the one or more second upper electrode sets is not less than a predetermined value.

6. The light distribution controllable touch panel device according to claim 5,
wherein the plurality of upper electrodes include third upper electrodes provided between upper electrodes in each set of the one or more first upper electrode sets and between upper electrodes in each set of the one or more second upper electrode sets, and
wherein the driver is configured to:
provide the third upper electrodes with driving potentials, and
provide lower electrodes opposed to the third upper electrodes with driving potentials according to the driving potentials given to the third upper electrodes to control the colored electrophoretic particles in electrophoretic elements sandwiched by the third upper electrodes and the opposed lower electrodes with which the driving potentials are provided according to the driving potentials given to the third upper electrodes to be in the dispersed state or the collected state.

7. The light distribution controllable touch panel device according to claim 1, further comprising a storage unit holding correspondence information between information on rounded waveforms and coordinates in a direction perpendicular to a direction in which the upper electrodes are disposed side-by-side,
wherein the driver is configured to determine a coordinate of a touch point in the direction perpendicular to the direction in which the plurality of upper electrodes are disposed side-by-side in accordance with a rounded waveform representing measured potentials and the correspondence information.

8. The light distribution controllable touch panel device according to claim 1, wherein each set of the one or more first upper electrode sets and each set of the one or more second upper electrode sets each include one upper electrode.

9. The light distribution controllable touch panel device according to claim 1,
wherein a display panel is disposed under the plurality of lower electrodes to be opposed to the plurality of lower electrodes,
wherein the plurality of lower electrodes include:
one or more first lower electrode sets, each set including lower electrodes opposed to upper electrodes in a first upper electrode set of the one or more first upper electrode sets and connected by a conductor, and
one or more second lower electrode sets, each including lower electrodes opposed to upper electrodes in a second upper electrode set of the one or more second upper electrode sets and connected by a conductor, and
wherein the driver is configured to:
acquire a first received waveform representing measured potentials,
provide the one or more first lower electrode sets with driving potentials,
acquire a second received waveform representing potentials measured from the one or more second lower electrode sets, calculate a difference waveform between the first received waveform and the second received waveform, and determine a touch point based on the difference waveform.

10. The light distribution controllable touch panel device according to claim 1, wherein the driver is configured to maintain the colored electrophoretic particles in the plurality of electrophoretic elements in the dispersed state in the narrow viewing angle mode and maintain the colored electrophoretic particles in the plurality of electrophoretic elements in the collected state in a wide viewing angle mode, wherein the plurality of lower electrodes include:

one or more first lower electrode sets, each set including lower electrodes opposed to upper electrodes in a first upper electrode set of the one or more first upper electrode sets and connected by a conductor, and one or more second lower electrode sets, each set including lower electrodes opposed to upper electrodes in a second upper electrode set of the one or more second upper electrode sets and connected by a conductor, and wherein the driver is configured to:

provide each set of the one or more first upper electrode sets with a first potential and provide each set of the one or more second upper electrode sets with a second potential lower than the first potential, provide each set of the one or more first lower electrode sets with the first potential and provide each set of the one or more second lower electrode sets with the second potential in the narrow viewing angle mode, and provide each set of the one or more first lower electrode sets with a third potential higher than the first potential and provide each set of the one or more second lower electrode sets with a fourth potential higher than the second potential in the wide viewing angle mode.

11. The light distribution controllable touch panel device according to claim 10, wherein the fourth potential is a difference between the third potential and the first potential.

12. The light distribution controllable touch panel device according to claim 1, wherein the plurality of upper electrodes include third upper electrodes each provided between a first upper electrode set of the one or more first upper electrode sets and a second upper electrode set of the one or more second upper electrode sets, and wherein the driver is configured to:

provide the third upper electrodes with driving potentials, and provide lower electrodes opposed to the third upper electrodes with driving potentials according to the driving potentials given to the third upper electrodes to control the colored electrophoretic particles in electrophoretic elements sandwiched by the third upper electrodes and the opposed lower electrodes provided with which the driving potentials are provided according to the driving potentials given to the third upper electrodes to be in the dispersed state or the collected state.

\* \* \* \* \*